(12) United States Patent
Ibrahim et al.

(10) Patent No.: US 12,010,069 B2
(45) Date of Patent: Jun. 11, 2024

(54) CELL-LEVEL CROSS LINK INTERFERENCE SOUNDING REFERENCE SIGNAL

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Seyedkianoush Hosseini, San Diego, CA (US); Huilin Xu, Temecula, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 17/452,457

(22) Filed: Oct. 27, 2021

(65) Prior Publication Data
US 2023/0125512 A1    Apr. 27, 2023

(51) Int. Cl.
*H04L 5/00* (2006.01)
*H04B 17/345* (2015.01)
*H04L 5/14* (2006.01)

(52) U.S. Cl.
CPC ......... *H04L 5/0073* (2013.01); *H04B 17/345* (2015.01); *H04L 5/0042* (2013.01); *H04L 5/0044* (2013.01); *H04L 5/0048* (2013.01); *H04L 5/14* (2013.01)

(58) Field of Classification Search
CPC . H04W 24/10; H04W 72/541; H04W 72/542; H04B 17/345; H04B 17/318; H04B 17/327; H04L 5/0044; H04L 5/0048; H04L 5/0073; H04L 5/14; H04L 25/0226; H04J 11/0023; H04J 11/005
See application file for complete search history.

(56) References Cited

U.S. PATENT DOCUMENTS

| | | | |
|---|---|---|---|
| 2016/0360559 A1* | 12/2016 | Chrisikos | H04W 8/005 |
| 2018/0338326 A1* | 11/2018 | Sadek | H04W 74/0808 |
| 2020/0213052 A1* | 7/2020 | Li | H04W 72/23 |
| 2022/0386156 A1* | 12/2022 | Park | H04W 24/10 |
| 2023/0106194 A1* | 4/2023 | Rudolf | H04W 74/006 370/329 |
| 2023/0189382 A1* | 6/2023 | Haustein | H04W 76/20 370/329 |

\* cited by examiner

*Primary Examiner* — Quoc Thai N Vu
(74) *Attorney, Agent, or Firm* — Harrity & Harrity, LLP

(57) ABSTRACT

Various aspects of the present disclosure generally relate to wireless communication. In some aspects, a user equipment (UE) may receive a cell-level cross link interference sounding reference signal (CLI-SRS) configuration, wherein the cell-level CLI-SRS configuration identifies CLI-SRS resources in one or more full-duplex slots for cross link interference measurements associated with Uu and sidelink communications. The UE may receive an indication to transmit a CLI-SRS, or to measure cross link interference, in a CLI-SRS resource of the CLI-SRS resources identified in the cell-level CLI-SRS configuration. The UE may transmit the CLI-SRS in the CLI-SRS resource or measuring cross-link interference in connection with a CLI-SRS transmission from another UE in the CLI-SRS resource based at least in part on the indication. Numerous other aspects are described.

30 Claims, 16 Drawing Sheets

CELL-LEVEL CROSS LINK INTERFERENCE SOUNDING REFERENCE SIGNAL

FIELD OF THE DISCLOSURE

Aspects of the present disclosure generally relate to wireless communication and to techniques and apparatuses for measuring cross link interference (CLI) using a cell-level CLI sounding reference signal (CLI-SRS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include receiving a cell-level cross link interference sounding reference signal (CLI-SRS) configuration, wherein the cell-level CLI-SRS configuration identifies CLI-SRS resources in one or more full-duplex slots for cross link interference measurements associated with Uu and sidelink communications. The method may include receiving an indication to transmit a CLI-SRS, or to measure cross link interference, in a CLI-SRS resource of the CLI-SRS resources identified in the cell-level CLI-SRS configuration. The method may include transmitting the CLI-SRS in the CLI-SRS resource or measuring cross-link interference in connection with a CLI-SRS transmission from a second UE in the CLI-SRS resource based at least in part on the indication.

Some aspects described herein relate to a method of wireless communication performed by a base station. The method may include transmitting, to a UE, a cell-level CLI-SRS configuration, wherein the cell-level CLI-SRS configuration identifies CLI-SRS resources in one or more full-duplex slots for cross link interference measurements associated with Uu and sidelink communications. The method may include transmitting, to the UE, an indication to transmit a CLI-SRS, or to measure cross link interference, in a CLI-SRS resource of the CLI-SRS resources identified in the cell-level CLI-SRS configuration.

Some aspects described herein relate to a first UE for wireless communication. The first UE may include a memory and one or more processors coupled to the memory. The one or more processors may be configured to receive a cell-level CLI-SRS configuration, wherein the cell-level CLI-SRS configuration identifies CLI-SRS resources in one or more full-duplex slots for cross link interference measurements associated with Uu and sidelink communications. The one or more processors may be configured to receive an indication to transmit a CLI-SRS, or to measure cross link interference, in a CLI-SRS resource of the CLI-SRS resources identified in the cell-level CLI-SRS configuration. The one or more processors may be configured to transmit the CLI-SRS in the CLI-SRS resource or measure cross-link interference in connection with a CLI-SRS transmission from a second UE in the CLI-SRS resource based at least in part on the indication.

Some aspects described herein relate to a base station for wireless communication. The base station may include a memory and one or more processors coupled to the memory. The one or more processors may be configured to transmit, to a UE, a cell-level CLI-SRS configuration, wherein the cell-level CLI-SRS configuration identifies CLI-SRS resources in one or more full-duplex slots for cross link interference measurements associated with Uu and sidelink communications. The one or more processors may be configured to transmit, to the UE, an indication to transmit a CLI-SRS, or to measure cross link interference, in a CLI-SRS resource of the CLI-SRS resources identified in the cell-level CLI-SRS configuration.

Some aspects described herein relate to a non-transitory computer-readable medium that stores a set of instructions for wireless communication by a UE. The set of instructions, when executed by one or more processors of the UE, may cause the UE to receive a cell-level CLI-SRS configuration, wherein the cell-level CLI-SRS configuration identifies CLI-SRS resources in one or more full-duplex slots for cross link interference measurements associated with Uu and sidelink communications. The set of instructions, when executed by one or more processors of the UE, may cause the UE to receive an indication to transmit a CLI-SRS, or to measure cross link interference, in a CLI-SRS resource of the CLI-SRS resources identified in the cell-level CLI-SRS configuration. The set of instructions, when executed by one or more processors of the UE, may cause the UE to transmit the CLI-SRS in the CLI-SRS resource or measure cross-link interference in connection with a CLI-SRS transmission from a second UE in the CLI-SRS resource based at least in part on the indication.

Some aspects described herein relate to a non-transitory computer-readable medium that stores a set of instructions for wireless communication by a base station. The set of instructions, when executed by one or more processors of the base station, may cause the base station to transmit, to a UE, a cell-level CLI-SRS configuration, wherein the cell-level CLI-SRS configuration identifies CLI-SRS resources in one or more full-duplex slots for cross link interference measurements associated with Uu and sidelink communications. The set of instructions, when executed by one or more processors of the base station, may cause the base station to transmit, to the UE, an indication to transmit a CLI-SRS, or to measure cross link interference, in a CLI-SRS resource of the CLI-SRS resources identified in the cell-level CLI-SRS configuration.

Some aspects described herein relate to an apparatus for wireless communication. The apparatus may include means for receiving a cell-level CLI-SRS configuration, wherein the cell-level CLI-SRS configuration identifies CLI-SRS resources in one or more full-duplex slots for cross link interference measurements associated with Uu and sidelink communications. The apparatus may include means for receiving an indication to transmit a CLI-SRS, or to measure cross link interference, in a CLI-SRS resource of the CLI-SRS resources identified in the cell-level CLI-SRS configuration. The apparatus may include means for transmitting the CLI-SRS in the CLI-SRS resource or measuring cross-link interference in connection with a CLI-SRS transmission from a UE in the CLI-SRS resource based at least in part on the indication.

Some aspects described herein relate to an apparatus for wireless communication. The apparatus may include means for transmitting, to a UE, a cell-level CLI-SRS configuration, wherein the cell-level CLI-SRS configuration identifies CLI-SRS resources in one or more full-duplex slots for cross link interference measurements associated with Uu and sidelink communications. The apparatus may include means for transmitting, to the UE, an indication to transmit a CLI-SRS, or to measure cross link interference, in a CLI-SRS resource of the CLI-SRS resources identified in the cell-level CLI-SRS configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
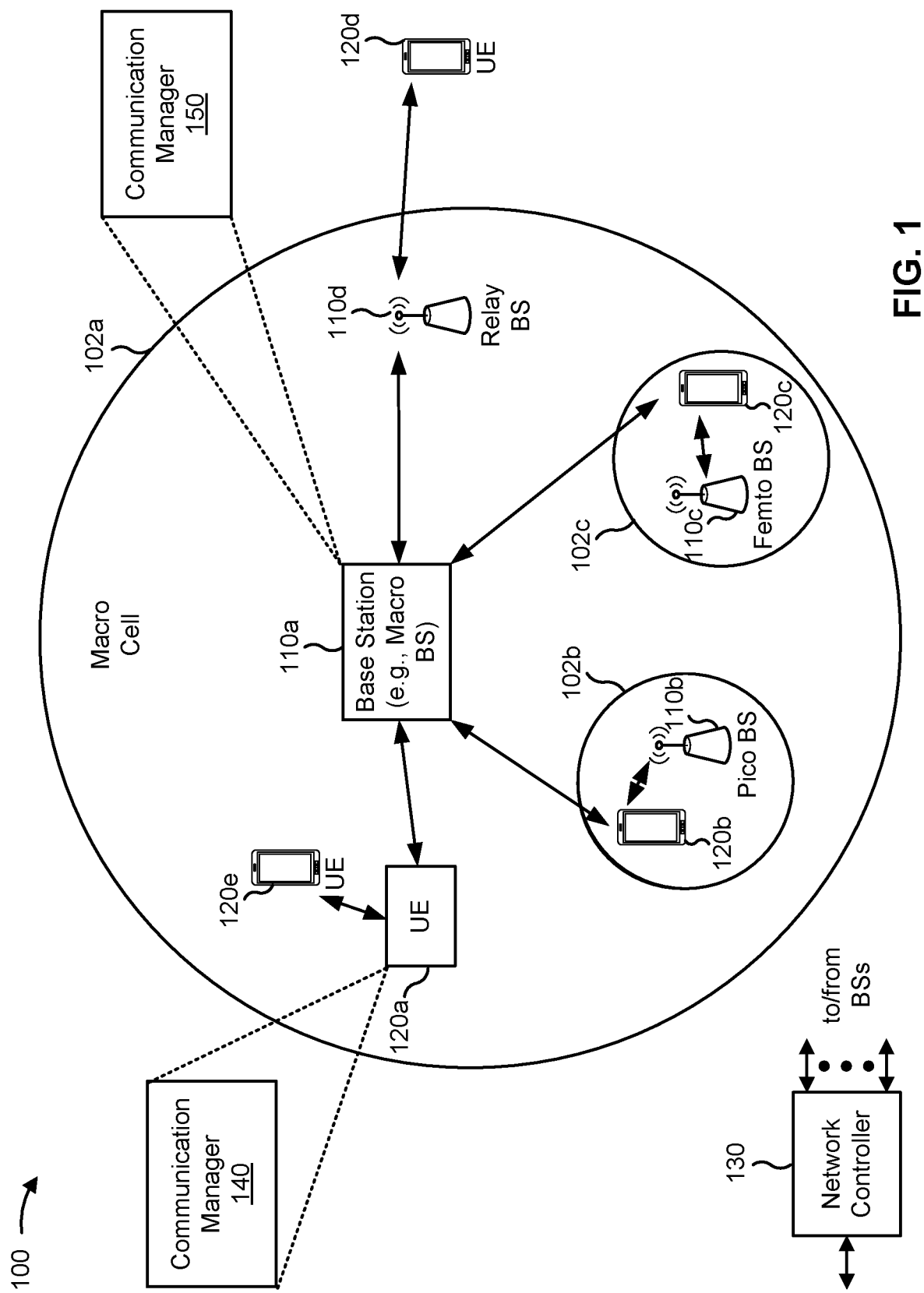
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a cell-level cross link interference sounding reference signal (CLI-SRS) configuration, wherein the cell-level CLI-SRS configuration identifies CLI-SRS resources in one or more full-duplex slots for cross link interference measurements associated with Uu and sidelink communications; receive an indication to transmit a CLI-SRS, or to measure cross link interference, in a CLI-SRS resource of the CLI-SRS resources identified in the cell-level CLI-SRS configuration; and transmit the CLI-SRS in the CLI-SRS resource or measure cross-link interference in connection with a CLI-SRS transmission from another UE in the CLI-SRS resource based at least in part on the indication. Additionally, or alternatively, the communication manager 140 may perform one or more other operations described herein.

In some aspects, the base station 110 may include a communication manager 150. As described in more detail elsewhere herein, the communication manager 150 may transmit, to a UE, a cell-level CLI-SRS configuration, wherein the cell-level CLI-SRS configuration identifies CLI-SRS resources in one or more full-duplex slots for cross link interference measurements associated with Uu and sidelink communications; and transmit, to the UE, an indication to transmit a CLI-SRS or to measure cross link interference in a CLI-SRS resource of the CLI-SRS resources identified in the cell-level CLI-SRS configuration. Additionally, or alternatively, the communication manager 150 may perform one or more other operations described herein.

As indicated above, FIG. 1 is provided as an example. Other examples may differ from what is described with regard to FIG. 1.

Figure 2:
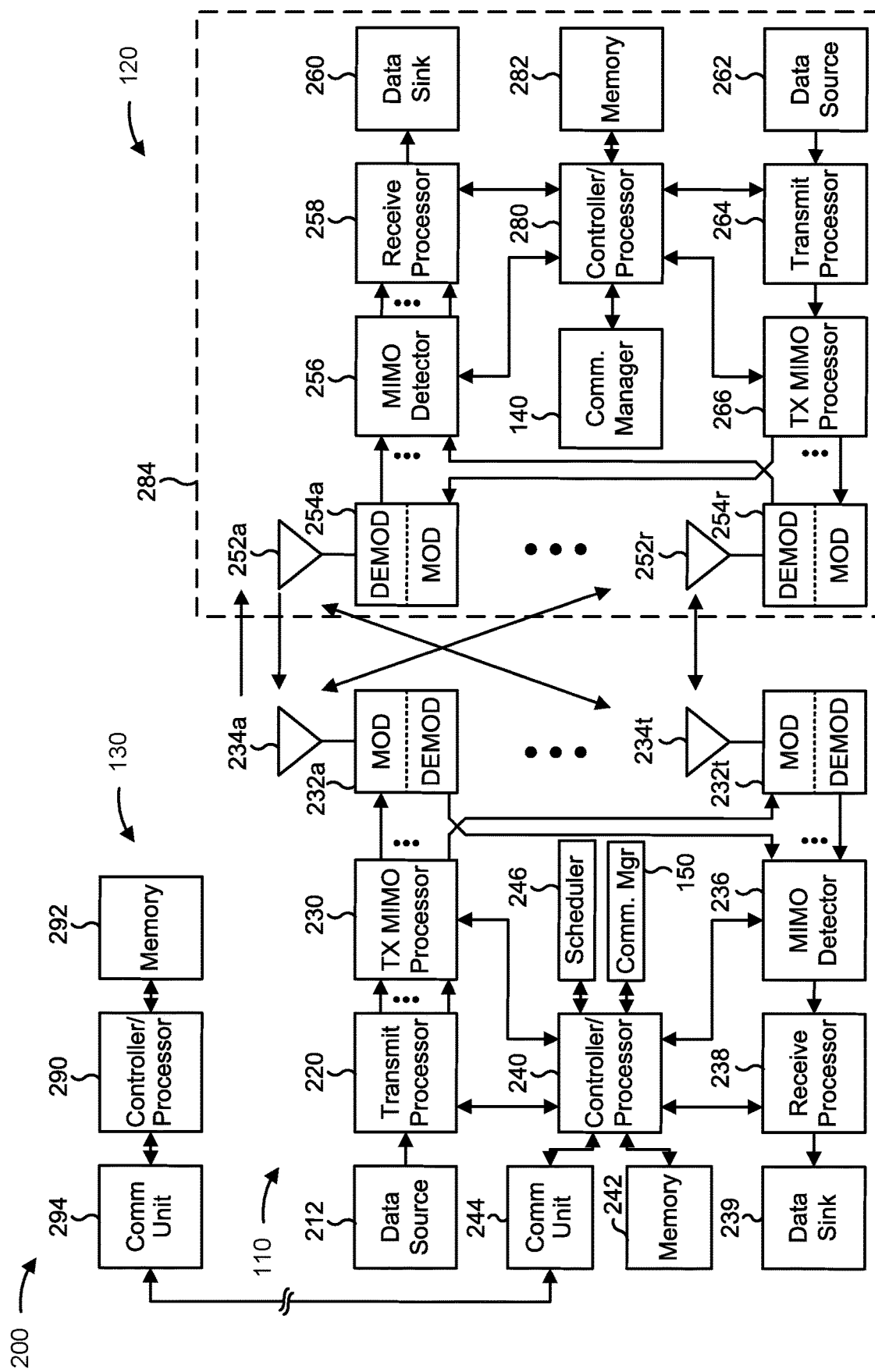
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-14).

The controller/processor 240 of the base station 110, the controller/processor 280 of the UE 120, and/or any other component(s) of FIG. 2 may perform one or more techniques associated with measuring cross link interference using a cell-level CLI-SRS, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving a cell-level CLI-SRS configuration, wherein the cell-level CLI-SRS configuration identifies CLI-SRS resources in one or more full-duplex slots for cross link interference measurements associated with Uu and sidelink communications; means for receiving an indication to transmit a CLI-SRS, or to measure cross link interference, in a CLI-SRS resource of the CLI-SRS resources identified in the cell-level CLI-SRS configuration; and/or means for transmitting the CLI-SRS in the CLI-SRS resource or measuring cross-link interference in connection with a CLI-SRS transmission from a second UE in the CLI-SRS resource based at least in part on the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, a cell-level CLI-SRS configuration, wherein the cell-level CLI-SRS configuration identifies CLI-SRS resources in one or more full-duplex slots for cross link interference measurements associated with Uu and sidelink communications; and/or means for transmitting, to the UE, an indication to transmit a CLI-SRS or to measure cross link interference in a CLI-SRS resource of the CLI-SRS resources identified in the cell-level CLI-SRS configuration. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3A:
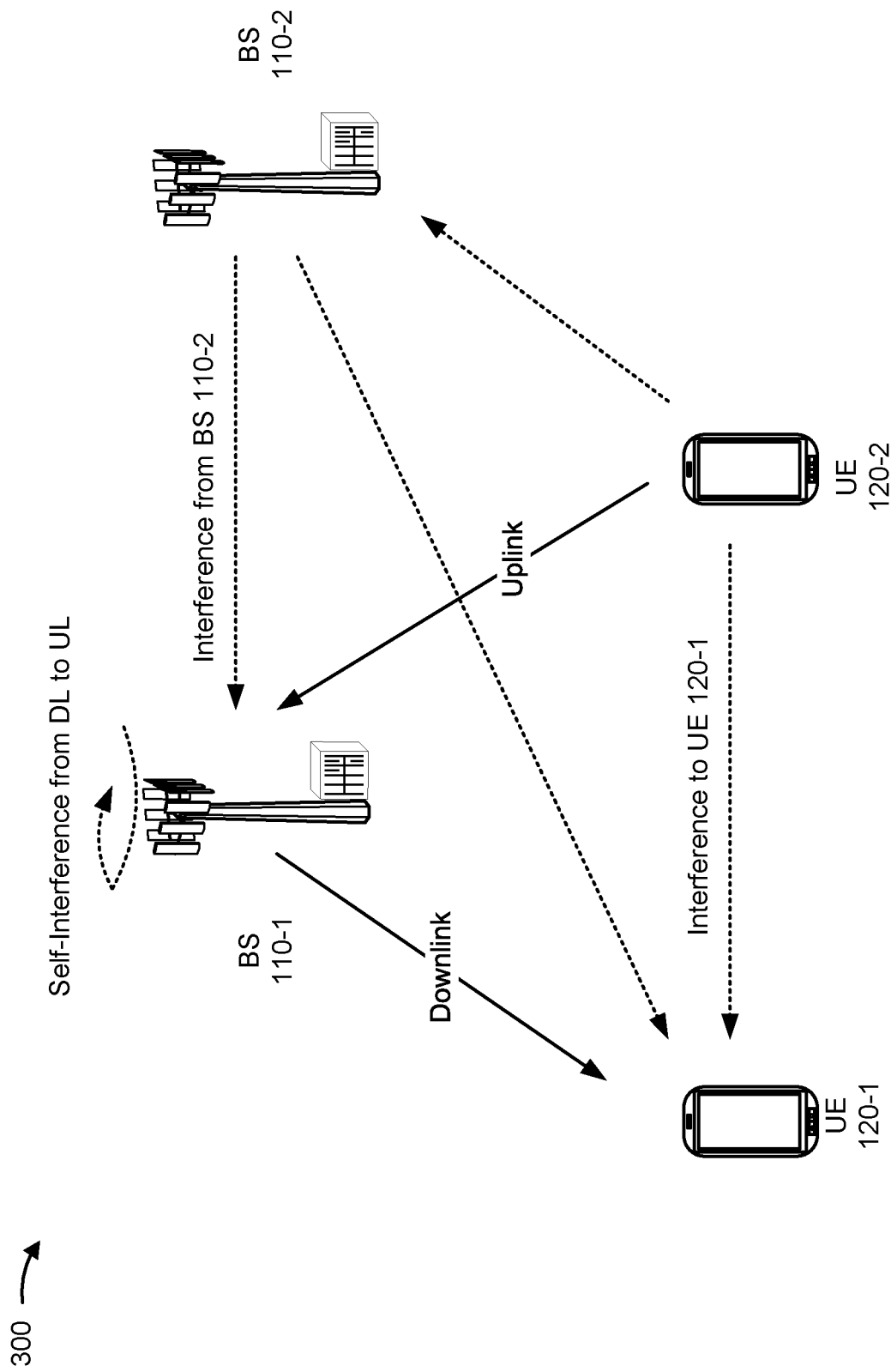
FIGS. 3A-3C are diagrams illustrating examples of interference associated with full-duplex (FD) communications, in accordance with the present disclosure.
Figure 3B:
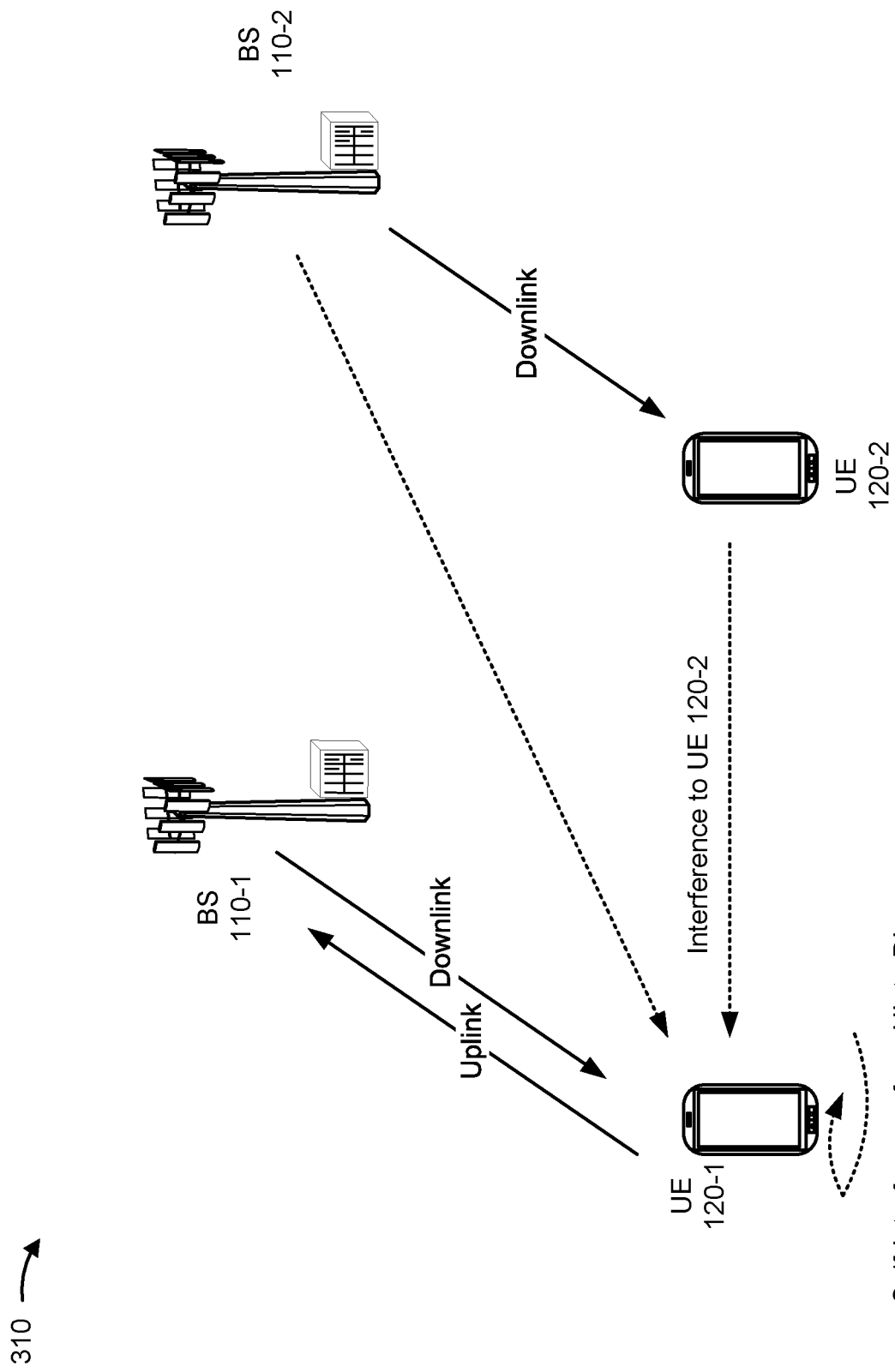
Figure 3C:
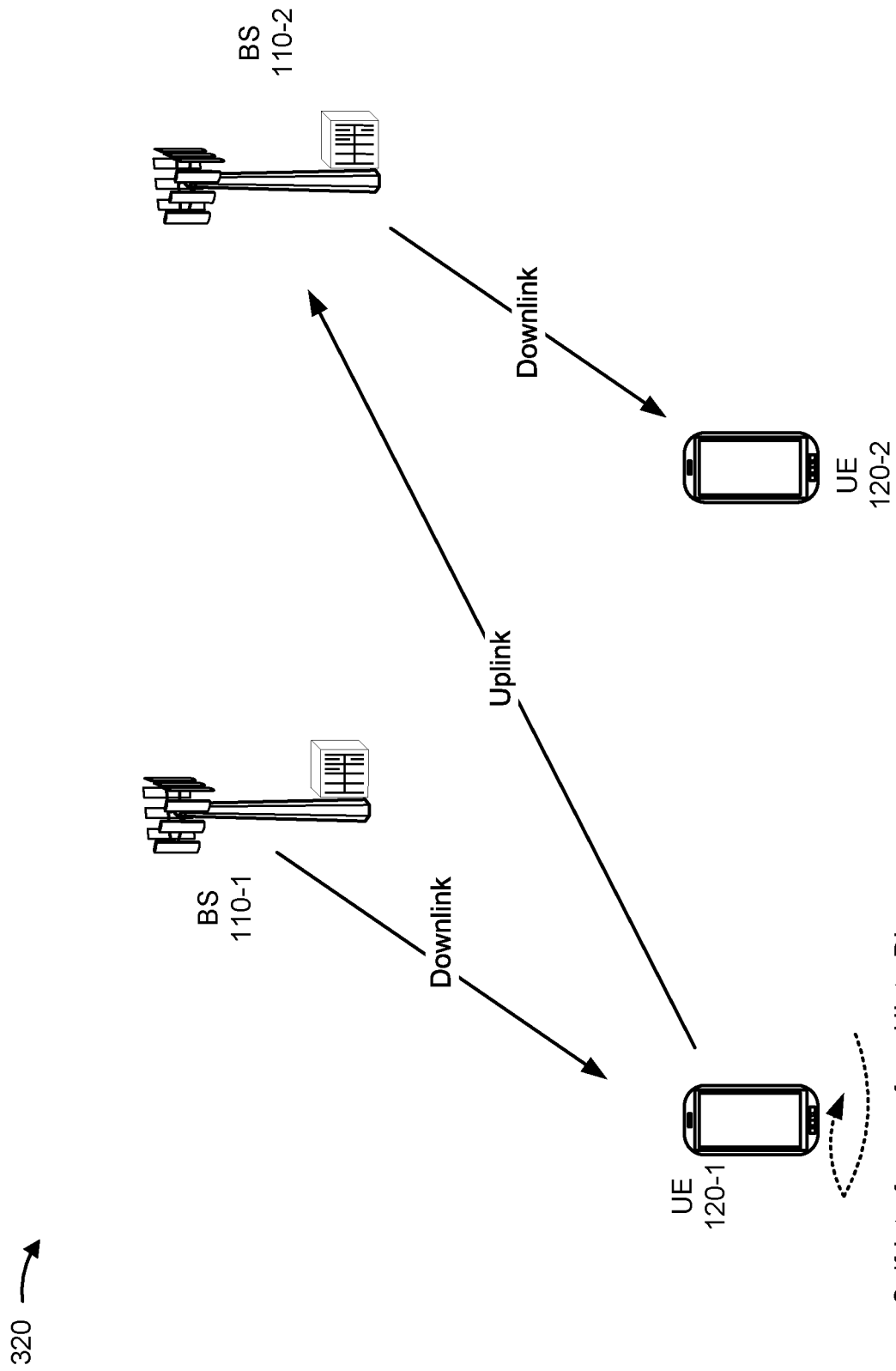

FIGS. 3A-3C are diagrams illustrating examples 300, 310, 320 of interference associated with full-duplex (FD) communications, in accordance with the present disclosure. As shown, examples 300, 310, 320 include a BS 110-1, a BS 110-2, a UE 120-1, and a UE 120-2.

FD communication may include simultaneous transmission and reception by a single device (e.g., a single UE 120 or a single base station 110). For example, a device may transmit a first communication and receive a second communication at the same time, such as in the same time domain resource (e.g., in the same symbol or in the same slot). FD communications transmitted by a device may overlap completely or partially in time. In some aspects, FD communications may be transmitted and received using the same frequency. Alternatively, FD communications may be transmitted and received using different frequencies. Examples of FD communications include simultaneous uplink (UL) and downlink (DL) communications (e.g., UL transmission and DL reception by a UE 120, or DL transmission and UL reception by a base station 110), simultaneous UL and sidelink (SL) communications (e.g., UL transmission and SL reception by a UE 120), simultaneous DL and SL communications (e.g., SL transmission and DL reception by a UE 120), and simultaneous SL reception and SL transmission (e.g., by a UE 120).

As shown in FIG. 3A, in example 300, the BS 110-1 may use FD communication to simultaneously transmit a DL transmission to the UE 120-1 and receive an UL transmission from the UE 120-2 using the same or different frequency resources and at least partially overlapping in time. In this example, the UE 120-1 may experience interference from the UE 120-2 transmitting an uplink transmission to the BS 110-1. Interference on a UE (e.g., UE 120-1) from another UE (e.g., UE 120-2) is referred to as cross link interference (CLI). CLI may be intra-cell CLI (e.g., UE 120-2 is in the same cell as UE 120-1) or inter-cell CLI (e.g., UE 120-1 and UE 120-2 are in adjacent cells). A UE receiving the CLI (e.g., UE 120-1) may be referred to as a "victim UE" and a UE causing the CLI (e.g., UE 120-2) may be referred to as an "aggressor UE." Additionally, or alternatively, the UE 120-1 may experience interference from the BS 110-2 transmitting a downlink transmission to the UE 120-2. Additionally, or alternatively, the BS 110-1 may experience interference from the BS 110-2, which may be transmitting on a downlink to the UE 120-1. Further, the DL transmission from the BS 110-1 to the UE 120-1 may self-interfere with the UL transmission from the UE 120-2 to the BS 110-1. This may be caused by a variety of factors, such as a higher transmit power used for the DL transmission (as compared to the UL transmission) and/or radio frequency bleeding.

As shown in FIG. 3B, in example 310, the UE 120-1 may use FD communication to simultaneously transmit an UL transmission to the BS 110-1 and receive a DL transmission from the BS 110-1. In this example, the UE 120-1 may experience interference from the UE 120-2 and/or the BS 110-2 as a result of communication between the BS 110-2 and the UE 120-2. Additionally, or alternatively, the UL transmission from the UE 120-1 to the BS 110-1 may self-interfere with the DL transmission from the BS 110-1 to the UE 120-1. This may be caused by, for example, a higher transmit power for the UL transmission as compared to the DL transmission.

As shown in FIG. 3C, in example 320, the UE 120-1 may use FD communication to simultaneously receive a DL transmission from the BS 110-1 and transmit an UL transmission to the BS 110-2. In some examples, the BS 110-2 may also transmit a DL transmission to UE 120-2. Thus, in some examples, the BS 110-2 and the UE 120-1 may operate in an FD mode. In this example, the UL transmission from the UE 120-1 to the BS 110-2 may self-interfere with the DL transmission from the BS 110-1 to the UE 120-1. This may be caused by, for example, a higher transmit power for the UL transmission as compared to the DL transmission.

Some techniques and apparatuses described herein assist with the design of periodic communications in a communication system that uses both half duplex and full duplex communication to mitigate complexity introduced by full duplex communication.

As indicated above, FIGS. 3A-3C are provided as examples. Other examples may differ from what is described with respect to FIGS. 3A-3C.

Figure 4:
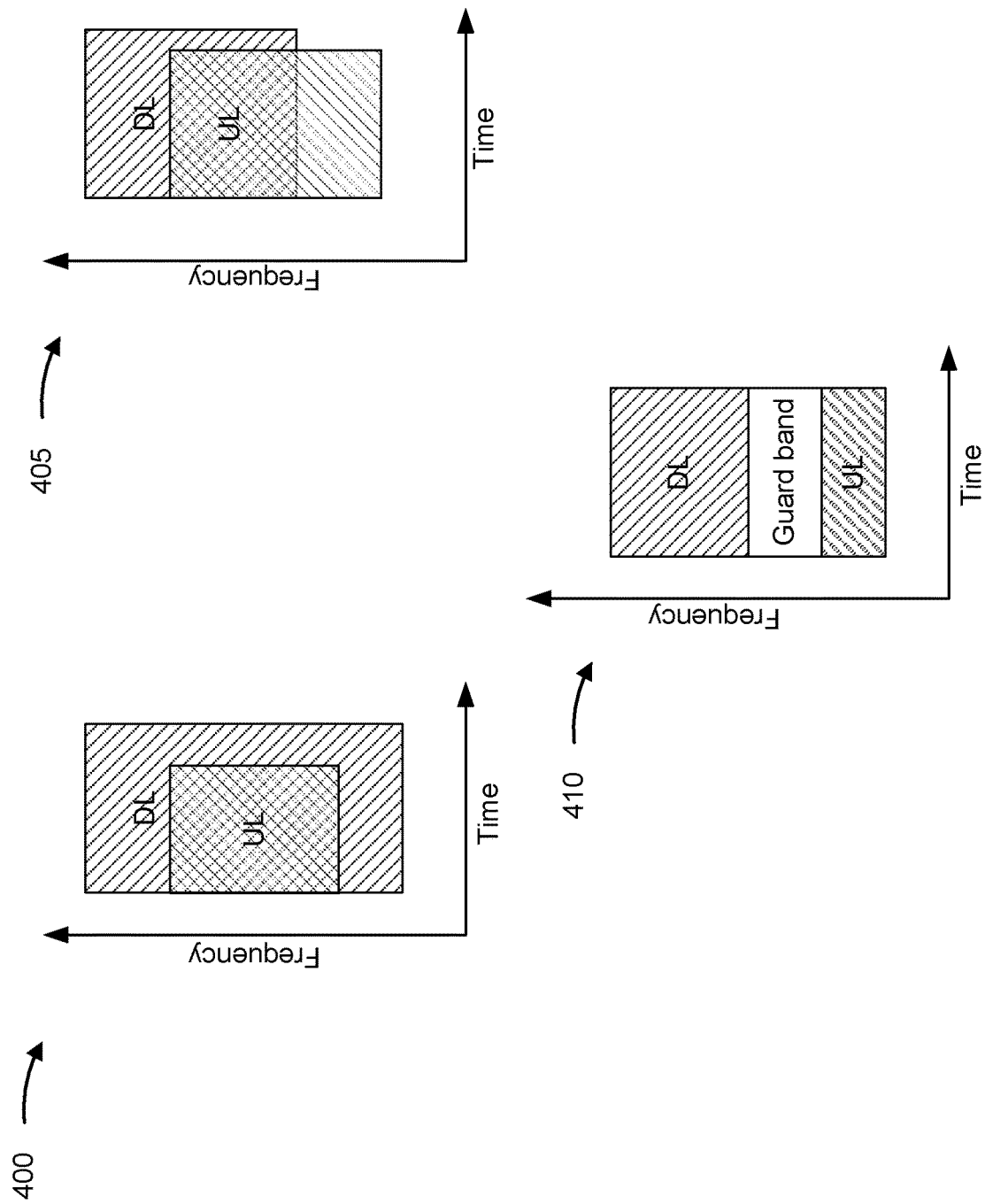
FIG. 4 is a diagram illustrating examples of FD communication in a wireless network, in accordance with the present disclosure.

FIG. 4 is a diagram illustrating examples 400, 405, and 410 of FD communication in a wireless network, in accordance with the present disclosure. "FD communication" in a wireless network refers to simultaneous bi-directional communication between devices in the wireless network. For example, a UE operating in an FD mode may transmit uplink communications and receive downlink communications at the same time (e.g., in the same slot). "Half-duplex (HD) communication" in a wireless network refers to unidirectional communications (e.g., downlink or uplink communication) between devices at a given time (e.g., in a given slot).

As shown in FIG. 4, examples 400 and 405 show examples of in-band full-duplex (IBFD) communication. In IBFD, a UE may transmit uplink communications to a base station and receive downlink communications from the base station on the same time and frequency resources. As shown in example 400, in IBFD, the time and frequency resources for uplink communication may fully overlap with the time and frequency resources for downlink communication. Hence, as illustrated in example 400, in the box labeled UL, both uplink and downlink communications may be performed simultaneously. As shown in example 405, in IBFD, the time and frequency resources for uplink communication may partially overlap with the time and frequency resources for downlink communication.

As further shown in FIG. 4, example 410 shows an example of sub-band full-duplex (SBFD) communication, which may also be referred to as "flexible duplex." In SBFD, a UE may transmit uplink communications to a base station and receive downlink communications from the base station at the same time, but on different frequency resources. In this case, the downlink resource may be separated from the uplink resource, in the frequency domain, by a guard band.

As indicated above, FIG. 4 is provided as an example. Other examples may differ from what is described with respect to FIG. 4.

Figure 5:
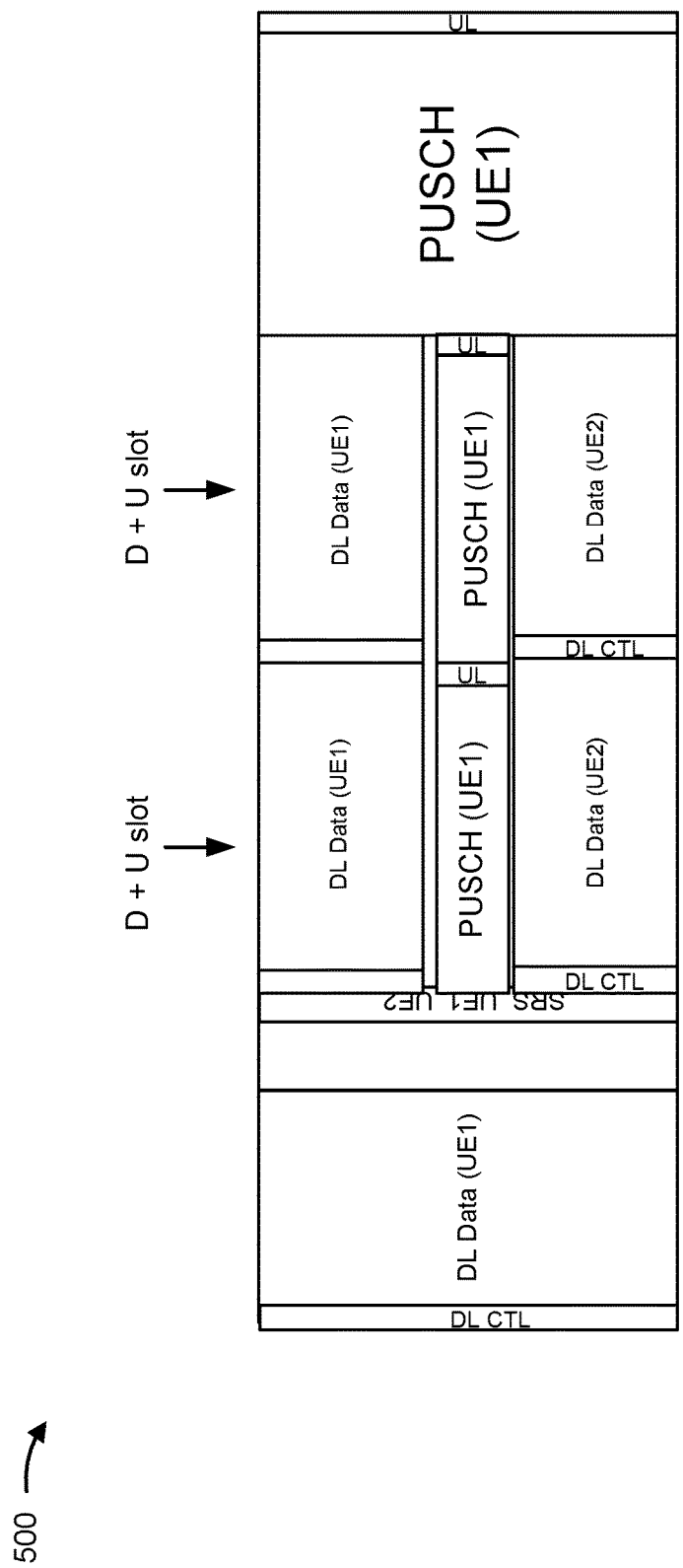
FIG. 5 is a diagram illustrating an example of a sub-band full-duplex (SBFD) slot format, in accordance with the present disclosure.

FIG. 5 is a diagram illustrating an example 500 of a SBFD slot format, in accordance with the present disclosure. As shown in FIG. 5, example 500 includes a DL slot, followed by two full-duplex ("D+U") slots, and a UL slot. In the DL slot, a first UE (UE1) may operate in HD mode to receive DL data (e.g., physical downlink shared channel (PDSCH) communications) from a base station. In the UL slot, the UE1 may operate in HD mode to transmit physical uplink shared channel (PUSCH) communications to the base station.

The D+U slots are slots that are used for simultaneous uplink and downlink communications. As shown in FIG. 5, in SBFD, the downlink and uplink communications may occur in adjacent frequency bands, which may be separated by guard bands. In IBFD, the downlink and uplink communications may occur in overlapping frequency bands. A D+U slot may include DL only symbols, UL only symbols, and/or FD (e.g., D+U) symbols. In a D+U symbol, an HD UE (e.g., UE2) may either transmit in the UL band or receive in the DL band. In a D+U symbol, an FD UE (e.g., UE1) may transmit in the UL band and/or receive in the DL band in the same slot/symbol.

In SBFD, a base station may configure a DL transmission to a UE in frequency domain resources adjacent to the frequency domain resources configured for an UL transmission from another UE. For example, as shown in FIG. 5, the UE1 may be configured with frequency domain resources for UL transmission and DL reception in the D+U slots (e.g., FD operation), and a second UE (UE2) may be configured with frequency resources for DL reception in the D+U slots (e.g., HD operation). In this case, the base station may configure the DL transmission to the UE2 in adjacent frequency resources as the frequency resources configured for the uplink transmission from the UE1. The uplink transmission from UE1 may cause CLI on the DL reception at UE2. For example, the CLI may be due to energy leakage caused by timing and frequency unalignment between the two UEs, and/or due to automatic gain control (AGC) mismatch if UE2's AGC is driven by a DL serving cell signal of UE2, but the CLI is strong enough to saturate the AGC.

As indicated above, FIG. 5 is provided as an example. Other examples may differ from what is described with respect to FIG. 5.

Figure 6:
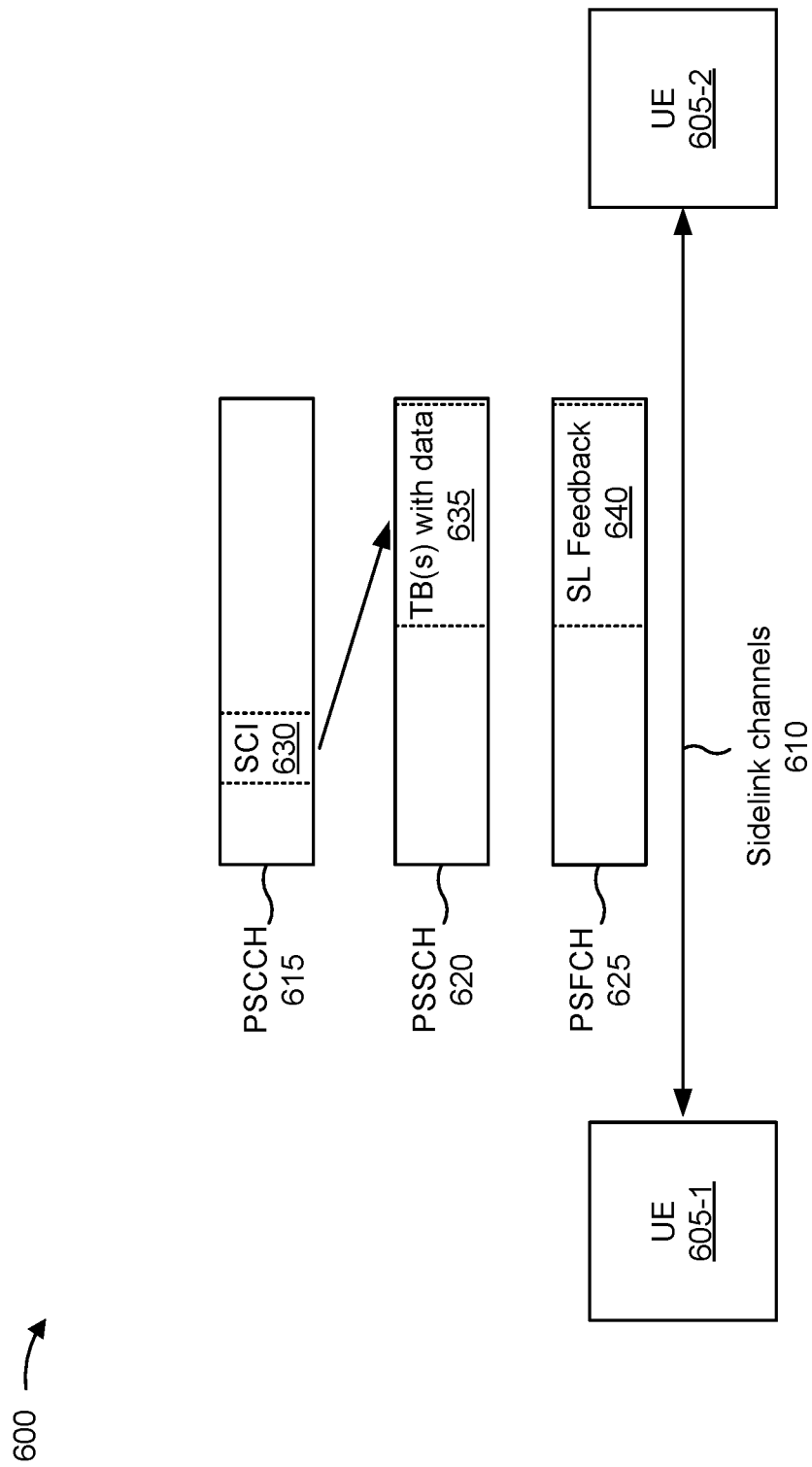
FIG. 6 is a diagram illustrating an example of sidelink communications, in accordance with the present disclosure.

FIG. 6 is a diagram illustrating an example 600 of sidelink communications, in accordance with the present disclosure.

As shown in FIG. 6, a first UE 605-1 may communicate with a second UE 605-2 (and one or more other UEs 605) via one or more sidelink channels 610. The UEs 605-1 and 605-2 may communicate using the one or more sidelink channels 610 for P2P communications, D2D communications, V2X communications (e.g., which may include V2V communications, V2I communications, and/or V2P communications) and/or mesh networking. In some examples, the UEs 605 (e.g., UE 605-1 and/or UE 605-2) may correspond to one or more other UEs described elsewhere herein, such as UE 120. In some examples, the one or more sidelink channels 610 may use a PC5 interface and/or may operate in a high frequency band (e.g., the 5.9 GHz band). Additionally, or alternatively, the UEs 605 may synchronize timing of transmission time intervals (TTIs) (e.g., frames, subframes, slots, or symbols) using global navigation satellite system (GNSS) timing.

As further shown in FIG. 6, the one or more sidelink channels 610 may include a physical sidelink control channel (PSCCH) 615, a physical sidelink shared channel (PSSCH) 620, and/or a physical sidelink feedback channel (PSFCH) 625. The PSCCH 615 may be used to communicate control information, similar to a physical downlink control channel (PDCCH) and/or a physical uplink control channel (PUCCH) used for cellular communications with a base station 110 via an access link or an access channel. The PSSCH 620 may be used to communicate data, similar to a PDSCH and/or a PUSCH used for cellular communications with a base station 110 via an access link or an access channel. For example, the PSCCH 615 may carry sidelink control information (SCI) 630, which may indicate various control information used for sidelink communications, such as one or more resources (e.g., time resources, frequency resources, and/or spatial resources) where a transport block (TB) 635 may be carried on the PSSCH 620. The TB 635 may include data. The PSFCH 625 may be used to communicate sidelink feedback 640, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 615, in some examples, the SCI 630 may include multiple communications in different stages, such as a first stage SCI (SCI-1) and a second stage SCI (SCI-2). The SCI-1 may be transmitted on the PSCCH 615. The SCI-2 may be transmitted on the PSSCH 620. The SCI-1 may include, for example, an indication of one or more resources (e.g., time resources, frequency resources, and/or spatial resources) on the PSSCH 620, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 620, such as a HARQ process ID, a new data indicator (NDI), a source identifier, a destination identifier, and/or a channel state information (CSI) report trigger.

In some examples, the one or more sidelink channels 610 may use resource pools. For example, a scheduling assignment (e.g., included in SCI 630) may be transmitted in sub-channels using specific resource blocks (RBs) across time. In some examples, data transmissions (e.g., on the PSSCH 620) associated with a scheduling assignment may occupy adjacent RBs in the same subframe as the scheduling assignment (e.g., using frequency division multiplexing). In some examples, a scheduling assignment and associated data transmissions are not transmitted on adjacent RBs. A UE 605 may be configured (or pre-configured) with a set of sidelink resource pools, and each resource pool may be defined as a set of time and frequency resources. The minimum transmission/reception (e.g., allocation) unit in the frequency domain may be a sub-channel, and each sub-channel is defined as a number of contiguous RBs. The allocation unit may be a slot in the time domain. For example, a sidelink resource pool, configured for a UE, may include a number of contiguous sub-channels in the frequency domain and a number of slots in the time domain. In some examples, the allocated slots in the sidelink resource pool may not be consecutive slots. For example, some slots may not be available for sidelink communications. Some slots in the sidelink resource pool may include feedback resources (e.g., PSFCH resources). Each sidelink resource pool may be further configured (or pre-configured) for Mode 1 resource allocation or Mode 2 resource allocation.

In Mode 1 resource allocation, a base station allocates resources for sidelink communications between UEs 605. For example, both dynamic allocation of sidelink resources via DCI (e.g., DCI format 3-x) and configured transmissions (e.g., type-1 and/or type2) may be supported in Mode 1. In Mode 2, resource selection and/or scheduling is autonomously performed by the UE 605 (e.g., rather than a base station 110). In some examples, the UE 605 may perform resource selection and/or scheduling by sensing channel availability for transmissions. For example, the UE 605 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 605 may perform resource selection and/or scheduling using SCI 630 received in the PSCCH 615, which may indicate occupied resources and/or channel parameters. Additionally, or alternatively, the UE 605 may perform resource selection and/or scheduling by determining a channel busy rate (CBR) associated with various sidelink channels, which may be used for rate control (e.g., by indicating a maximum number of RBs that the UE 605 can use for a particular set of subframes).

In the resource allocation mode where resource selection and/or scheduling is performed by a UE 605 (e.g., Mode 2), the UE 605 may generate sidelink grants, and may transmit the grants in SCI 630. A sidelink grant may indicate, for example, one or more parameters (e.g., transmission parameters) to be used for an upcoming sidelink transmission, such as one or more RBs to be used for the upcoming sidelink transmission on the PSSCH 620 (e.g., for TBs 635), one or more subframes to be used for the upcoming sidelink transmission, and/or an MCS to be used for the upcoming sidelink transmission. In some examples, a UE 605 may generate a sidelink grant that indicates one or more parameters for semi-persistent scheduling (SPS), such as a periodicity of a sidelink transmission. Additionally, or alternatively, the UE 605 may generate a sidelink grant for event-driven scheduling, such as for an on-demand sidelink message.

As indicated above, FIG. 6 is provided as an example. Other examples may differ from what is described with respect to FIG. 6.

Figure 7:
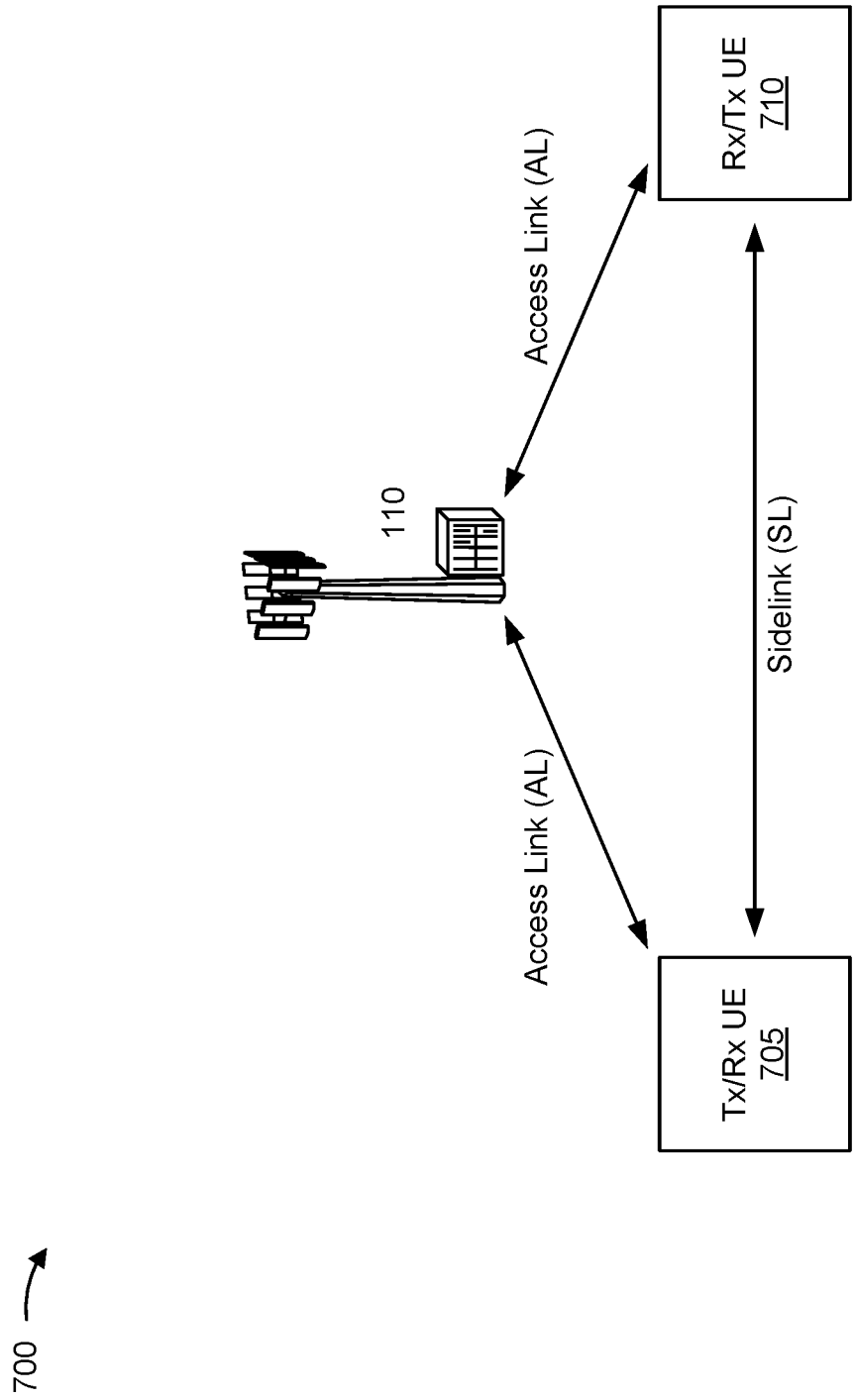
FIG. 7 is a diagram illustrating an example of sidelink communications and access link communications, in accordance with the present disclosure.

FIG. 7 is a diagram illustrating an example 700 of sidelink communications and access link communications, in accordance with the present disclosure.

As shown in FIG. 7, a transmitter (Tx)/receiver (Rx) UE 705 and an Rx/Tx UE 710 may communicate with one another via a sidelink, as described above in connection with FIG. 6. As further shown, in some sidelink modes, a base station 110 may communicate with the Tx/Rx UE 705 via a first access link. Additionally, or alternatively, in some sidelink modes, the base station 110 may communicate with the Rx/Tx UE 710 via a second access link. The Tx/Rx UE 705 and/or the Rx/Tx UE 710 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 7 is provided as an example. Other examples may differ from what is described with respect to FIG. 7.

In some examples, such as in the current 3GPP specification, sidelink operation is only permitted in slots with uplink resources (e.g., slots in which OFDM symbols are semi-statically configured as UL). In FD (e.g., SBFD/IBFD slots), sidelink and Uu (e.g., downlink and/or uplink) communications may occur simultaneously in the same slots. For example, in an SBFD slot, resources allocated for sidelink communications may replace the uplink resources (e.g., PUSCH) in the center bands of the D+U slots shown in FIG. 5. In this case, sidelink transmissions in a sub-channel adjacent to downlink resources may cause CLI on downlink reception at a nearby UE (e.g., due to CLI leakage from the sidelink sub-channel allocated to one UE to the DL frequency resources allocated to another UE). In an IBFD slot, there may be simultaneous uplink communication and a sidelink communications in the same frequency band, which may lead to CLI from the uplink transmission from a UE on the sidelink reception at another UE. In addition, sidelink transmission by one UE may cause CLI on sidelink reception of a different sidelink communication by another UE. However, a UE may not be configured with resources for measuring CLI from uplink and sidelink transmissions by other UEs on a downlink reception at the UE and/or CLI from an uplink transmission by another UE on a sidelink reception by the UE. As a result, a base station and/or Tx UE of a sidelink communication may not be able to mitigate such CLI, which may result in unreliable reception of downlink and/or sidelink communications.

Some techniques and apparatuses described herein enable UEs to perform CLI measurements for Uu and sidelink communications in an FD slot using a cell-level CLI-SRS. A UE may receive a cell-level CLI-SRS configuration that identifies CLI-SRS resources in one or more FD slots. The cell-level CLI-SRS resources may be shared between Uu UEs (e.g., UEs receiving downlink communications and/or UEs transmitting uplink communications) and sidelink UEs (e.g., UEs transmitting and/or receiving sidelink communications). A first UE may receive an indication to transmit a CLI-SRS in a CLI-SRS resource identified in the cell-level CLI-SRS configuration, and the first UE may transmit the CLI-SRS in the CLI-SRS resource based at least in part on the indication. A second UE may receive an indication to measure CLI in the CLI-SRS resources, and the second UE may measure CLI in connection with the CLI-SRS transmission by the first UE based at least in part on the indication. Using the cell-level CLI-SRS configuration, a UE may measure CLI from an uplink transmission or a sidelink transmission from another UE on a downlink reception or a sidelink reception at the UE. As a result, reliability of downlink and/or sidelink reception in FD slots may be increased, and the cell-level CLI-SRS based CLI measurements may facilitate simultaneous sidelink and Uu (e.g., downlink and/or uplink) communications in FD (e.g., SBFD and/or IBFD) slots.

Figure 8:
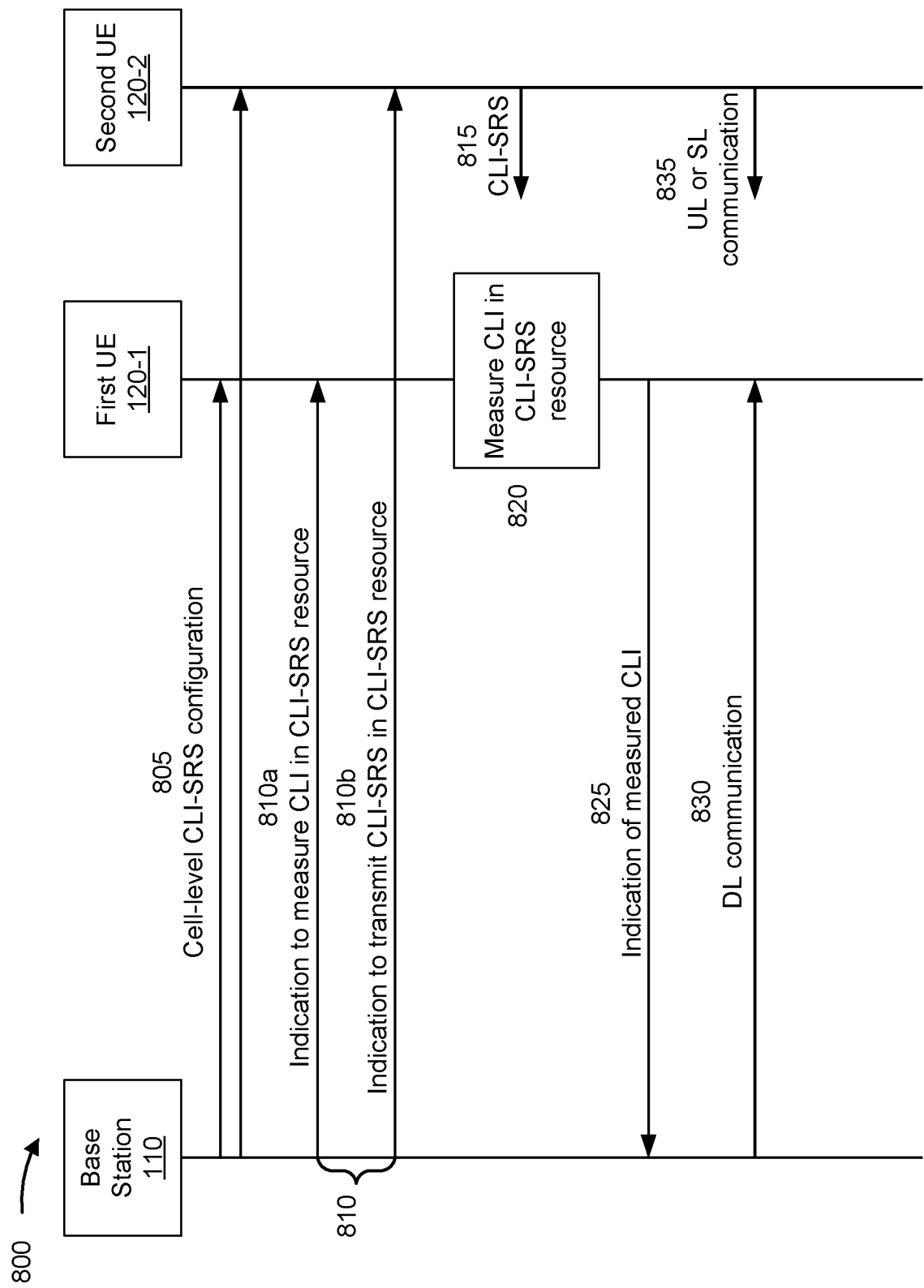
FIGS. 8-10 are diagrams illustrating examples associated with measuring cross link interference (CLI) using a cell-level CLI sounding reference signal (CLI-SRS), in accordance with the present disclosure.

FIG. 8 is a diagram illustrating an example 800 associated with measuring CLI using a cell-level CLI-SRS, in accordance with the present disclosure. As shown in FIG. 8, example 800 includes a base station 110 and one or more UEs 120, including a first UE 120-1 and a second UE 120-2. In some aspects, the base station 110 and the UEs 120 may be included in a wireless network, such as wireless network 100. The base station 110 may communicate with the UEs 120 via a wireless access link, which may include an uplink and a downlink. The first UE 120-1 and the second UE 120-2 may communicate via a sidelink.

In some aspects, the UEs 120 (e.g., the first UE 120-1, the second UE 120-2, and/or one or more other UEs 120) may include UEs with only Uu capability (e.g., "Uu only UEs"), UEs with both Uu sidelink capability (e.g., "Uu&SL UEs"), and/or UEs with only sidelink capability (e.g., "SL only UEs"). As used herein, "Uu UE" refers to a UE 120 that is communicating or is configured to communicate (e.g., in a given slot) via the Uu interface (e.g., downlink reception and/or uplink transmission). As used herein, "sidelink UE" or "SL UE" refers to a UE 120 that is communicating or is configured to communicate (e.g., in a given slot) via sidelink (e.g., sidelink transmission and/or sidelink reception via the PC5 interface). In example 800, the first UE 120-1 may be a Uu UE with resources allocated for reception of a downlink communication in an FD slot. In example 800, the second UE 120-2 may be a Uu UE with resources allocated for transmission of an uplink communication in the FD slot, or the second UE 120-2 may be a sidelink UE with resources allocated for transmission of a sidelink communication (e.g., to another UE 120) in the FD slot.

As shown in FIG. 8, and by reference number 805, the base station 110 may transmit, to one or more UEs 120 in a serving cell associated with the base station 110, a cell-level CLI-SRS configuration. The cell-level CLI-SRS configuration may identify a common configuration for a sounding reference signal (SRS) for measuring CLI (e.g., a CLI-SRS) for the UEs 120 in the serving cell associated with the base station 110. The cell-level CLI-SRS configuration may identify CLI-SRS resources, in FD slots, for CLI measurements associated with Uu and sidelink communications. The configured cell-level CLI-SRS resources may be used to transmit and/or measure the configured cell-level CLI-SRS on both Uu and sidelink. In some aspects, the CLI-SRS resources identified in the cell-level CLI-SRS configuration may include periodic CLI-SRS resources. In this case, the CLI-SRS resources may define periodic CLI-SRS occasions in which one or more UEs 120 may transmit the configured CLI-SRS in a CLI-SRS resource and one or other UEs 120 may measure CLI in connection with the transmitted CLI-SRS in the CLI-SRS resource. For example, the CLI-SRS resources may include X symbols dedicated for transmitting or measuring the CLI-SRS every Y slots.

The cell-level CLI-SRS may be detectable by both Uu UEs and sidelink UEs. As shown in FIG. 8, the first UE 120-1 and the second UE 120-2 may receive the cell-level CLI-SRS configuration from the base station 110. The cell-level SRS configuration may be semi-statically configured for the first UE 120-1 and the second UE 120-2. In some aspects, the first UE 120-1 may receive, from the base station 110, a serving cell configuration that includes the cell-level CLI-SRS configuration. For example, the base station 110 may transmit the serving cell configuration that includes the cell-level CLI-SRS configuration to the first UE 120-1 in a radio resource control (RRC) message. In some aspects, the second UE 120-2 may also receive, from the base station 110, the serving cell configuration (e.g., via an RRC message) that includes the cell-level CLI-SRS configuration. In some aspects, (e.g., in a case in which the second UE 120-2 is a sidelink UE), the second UE 120-2 may receive a sidelink resource pool configuration that includes the cell-level CLI-SRS configuration. For example, the second UE 120-2 may receive the sidelink resource pool configuration that includes the cell-level CLI-SRS configuration from the base station 110 or from another sidelink UE 120. In some aspects, Uu only and Uu&SL UEs may receive the cell-level CLI-SRS configuration from the base station 110 in a serving cell configuration, and SL only UEs may receive the cell-level CLI-SRS configuration in the sidelink resource pool configuration (e.g., via a sidelink synchronization symbol block (SSB) received from another sidelink UE).

In some aspects, because the cell-level CLI-SRS is cell-specific (e.g., as opposed to UE-specific), all or a portion of the configured CLI-SRS resources may be shared between Uu UEs and sidelink UEs. In some aspects, a subset of the total set of configured CLI-SRS resources may be configured for sidelink communications (e.g., configured in a sidelink resource pool). In Mode 1, sidelink resource allocation, the base station 110 may control the configuration and assignment of the cell-level CLI-SRS resources to both Uu UEs and sidelink UEs. In Mode 2, periodic CLI-SRS resources may be configured/pre-configured in the sidelink resource pools used for sidelink resource allocation. In this case, a subset of CLI-SRS resources may be dedicated to SL only UEs operating in Mode 2.

For sidelink, the cell-level CLI-SRS configuration may define CLI-SRS resources on a sidelink resource pool level. In some aspects, for each sidelink resource pool, the configuration may identify periodic CLI-SRS resources in that resource pool. For example, the configuration may indicate a periodicity for the CLI-SRS resources and a mapping of the CLI-SRS resources to dedicated symbols in sidelink slots or dedicated sidelink slots, in a sidelink resource pool, for CLI-SRS transmission. In some aspects, a sidelink resource pool may be configured with periodic CLI-SRS resources for X symbols every Y sidelink slots (e.g., a last X symbols every Y sidelink slots). Such periodic CLI-SRS resources in a sidelink resource pool may define periodic CLI-SRS occasions in which UEs 120 may transmit the CLI-SRS and/or measure CLI.

As further shown in FIG. 8, and by reference number 810, in some aspects, the base station 110 may transmit to the first UE 120-1, the second UE 120-2, and/or one or more other UEs 120, indications to transmit a CLI-SRS, or to measure CLI, in one or more of the CLI-SRS resources identified in the cell-level CLI-SRS configuration. In some aspects, the base station 110 may transmit, to each of the first UE 120-1, the second UE 120-2, and/or the one or more other UEs 120, a respective UE-specific configuration of CLI measurement resources and/or CLI-SRS transmission resources. The UE-specific configuration may indicate, for each of one or more configured cell-level CLI-SRS resources (e.g., for each of one or more configured periodic CLI-SRS occasions), whether the UE 120 is to transmit a CLI-SRS in the configured CLI-SRS resource or whether the UE 120 is to measure CLI in connection with a CLI-SRS transmission from another UE 120 (or UEs) in the CLI-SRS resource. In some aspects, the UE-specific configuration may include a configuration of a measurement resource for a CLI-SRS resource in which the UE 120 is to measure CLI. For example, the UE-configuration may include a configuration of a zero power CLI-SRS (ZP-CLI-SRS) for a CLI-SRS resource to indicate that the UE 120 is to measure CLI in the CLI-SRS resource. Additionally, or alternatively, the UE-specific configuration may include a configuration of a channel state information interference measurement (CSI-IM) associated with the CLI-SRS resource to indicate that the UE 120 is to measure CLI in the CLI-SRS resource. In some aspects, the UE-specific configuration may include a configuration of a non-zero power CLI-SRS (NZP-CLI-SRS) in a CLI-SRS resource to indicate that the UE 120 is to transmit the CLI-SRS in the CLI-SRS resource. In some aspects, the UE-specific configuration may be a semi-static configuration for one or more CLI-SRS occasions that is transmitted to the UE 120 in an RRC message.

As shown by reference number 810*a*, the first UE 120-1 may receive, from the base station 110, an indication to measure CLI in a CLI-SRS resource. For example, the base station 110 may transmit, to the first UE 120-1, a UE-specific configuration of CLI measurement resources and/or CLI-SRS transmission resources, and the UE-specific configuration may configure a measurement resource (e.g., a ZP-CLI-SRS) for the CLI-SRS resource. As shown by reference number 810*b*, the second UE 120-2 may receive, from the base station 110 (and/or from another UE 120 in a case in which the second UE 120-2 is a sidelink UE), an indication to transmit a CLI-SRS in the CLI-SRS resource. For example, the base station 110 may transmit, to the second UE 120-2, a UE-specific configuration of CLI measurement resources and/or CLI-SRS transmission resources, and the UE-specific configuration may configure a transmission resource (e.g., an NZP-CLI-SRS) for the CLI-SRS resource. In some aspects, the base station 110 may configure victim UEs (e.g., the first UE 120-1) or suspected victim UEs with CLI measurement resources (e.g., ZP-CLI-SRS) for cell-level CLI-SRS occasions, and the base station 110 may configure aggressor UEs (e.g., the second UE 120-2) or suspected aggressor UEs with CLI-SRS transmission resources for cell-level CLI-SRS occasions. The base station 110 may determine the victim UEs and/or the aggressor UEs based at least in part on location information associated with the UEs 120, scheduling information associated with the UEs 120, and/or observed performance degradation (e.g., in decoding received signals) for one or more UEs 120.

As further shown in FIG. 8, and by reference number 815, the second UE 120-2 may transmit the CLI-SRS in the CLI-SRS resource based at least in part on the indication for the second UE 120-2 to transmit the CLI-SRS in the CLI-SRS resource. The second UE 120-2 may transmit the CLI-SRS in the cell-level CLI-SRS resource (e.g., time and frequency resource) according to the cell-level CLI-SRS configuration. In a case in which the second UE 120-2 is operating in the Uu communication mode (e.g., the second UE 120-2 is configured with resources for transmitting an uplink communication), the second UE 120-2 may transmit the CLI-SRS to the base station 110 (e.g., in a beam direction associated with the uplink communication configured/scheduled for the second UE 120-2). In a case in which the second UE 120-2 is operating in the sidelink communication mode (e.g., the second UE 120-2 is configured with resources for transmitting a sidelink communication to an Rx UE), the second UE 120-2 may transmit the CLI-SRS in a beam direction toward the Rx UE (e.g., in a beam direction associated with the sidelink communication to be transmitted by the second UE 120-2).

As further shown in FIG. 8, and by reference number 820, the first UE 120-1 may measure CLI, in the CLI-SRS resource (e.g., the CLI-SRS occasion), in connection with the CLI-SRS transmission from the second UE 120-2. The first UE 120-1 may measure the CLI in the CLI-SRS resource based at least in part on the indication for the first UE 120-1 to measure CLI in the CLI-SRS resource. In some aspects, the first UE 120-1 may measure the RSRP at the first UE 120-1 from the CLI-SRS transmitted in the CLI-SRS resource by the second UE 120-2 (e.g., and from any other CLI-SRS transmissions in the CLI-SRS resource). Additionally, or alternatively, the first UE 120-1 may measure the RSSI (e.g., CLI-RSSI) from the CLI-SRS transmitted by the second UE 120-2 (e.g., and from any other CLI-SRS transmissions in the CLI-SRS resource). In some aspects, the first UE 120-1 may measure the CLI in connection with the CLI-SRS transmission from the second UE 120-2 in order to measure the CLI from an uplink transmission by the second UE 120-2 on a downlink reception by the first UE 120-1. In some aspects, the first UE 120-1 may measure the CLI in connection with the CLI-SRS transmission from the second UE 120-2 in order to measure the CLI from a sidelink transmission by the second UE 120-2 on a downlink reception by the first UE 120-1.

As further shown in FIG. 8, and by reference number 825, the first UE 120-1 may transmit, to the base station 110, an indication of the measured CLI. The first UE 120-1 may report the CLI measured in the CLI-SRS resource to the base station 110. In some aspects, the first UE 120-1 may use layer 1 (L1) reporting, layer 2 (L2) reporting, and/or layer 3 (L3) reporting to report the CLI measurement(s) to the base station 110. For example, the first UE 120-1 may transmit the indication of the measured CLI, to the base station 110, in at least one of a PUCCH communication, a medium access control (MAC) control element (MAC-CE), and/or an RRC message.

As further shown in FIG. 8, and by reference number 830, the base station 110 may transmit, to the first UE 120-1, a downlink communication in an FD slot. The first UE 120-1 may receive the downlink communication from the base station 110. As shown by reference number 835, the second UE 120-2 may transmit an uplink communication or a sidelink communication in the FD slot. For example, the second UE 120-2 may transmit an uplink communication to the base station 110, or the second UE 120-2 may transmit a sidelink communication to another UE 120 (e.g., an Rx UE). In some aspects, the second UE 120-2 may transmit the uplink communication or the sidelink communication simultaneously and/or overlapping with (in the time domain) the reception of the downlink communication by the first UE 120-1 (e.g., in separate frequency bands in a SBFD slot or in the same frequency band in an IBFD slot).

In some aspects, the base station 110 may adjust the uplink or sidelink transmission by the second UE 120-2 and/or the downlink transmission to the first UE 120-1 based at least in part on the indication of the measured CLI received from the first UE 120-1. For example, the base station 110 may adjust the transmission power of the uplink or sidelink (e.g., in Mode 1) transmission from the second UE 120-2, the allocated frequency and/or time resources for the downlink communication and/or the uplink or sidelink communication, and/or the beam direction for the downlink communication and/or the uplink or sidelink communication to reduce the CLI from the uplink or sidelink transmission by the second UE 120-2 on the downlink reception at the first UE 120-1. As a result, reliability of the downlink reception by the first UE 120-1 may be increased.

As indicated above, FIG. 8 is provided as an example. Other examples may differ from what is described with respect to FIG. 8.

Figure 9:
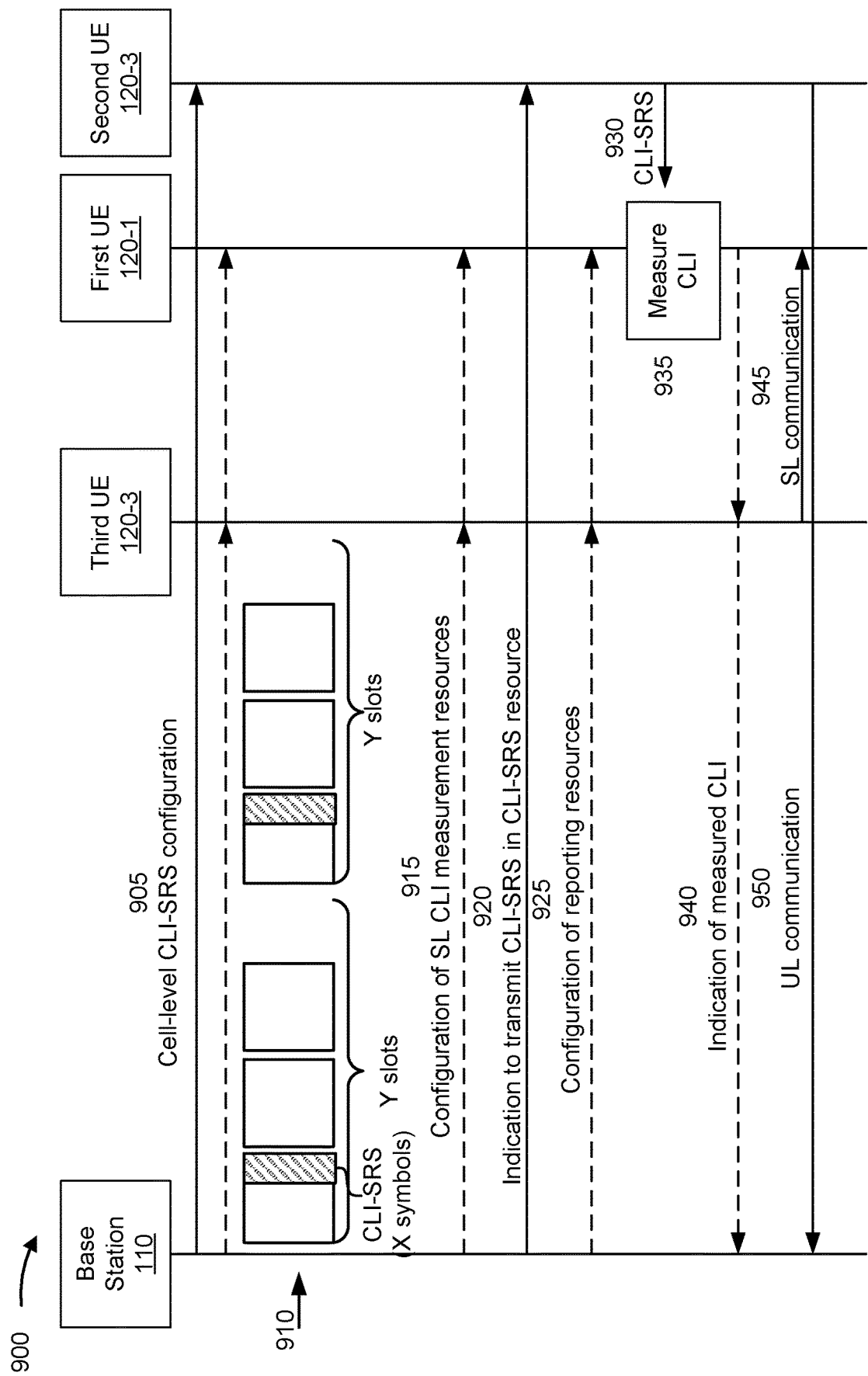

FIG. 9 is a diagram illustrating an example 900 associated with measuring CLI using a cell-level CLI-SRS, in accordance with the present disclosure. As shown in FIG. 9, example 900 includes a base station 110 and one or more UEs 120, including a first UE 120-1, a second UE 120-2, and a third UE 120-3. In some aspects, the base station 110 and the UEs 120 may be included in a wireless network, such as wireless network 100. The base station 110 may communicate with the UEs 120 via a wireless access link, which may include an uplink and a downlink. The first UE 120-1, the second UE 120-2, and/or the third UE 120-3 may communicate via sidelink.

In example 900, the first UE 120-1 and the third UE 120-3 may be sidelink UEs with resources allocated for a downlink communication between the third UE 120-3 and the first UE 120-1 in an FD slot. For example, the third UE 120-3 may be a Tx UE for the sidelink communication, and the first UE 120-1 may be an Rx UE for the sidelink communication. In example 900, the second UE 120-2 may be a Uu UE with resources allocated for transmission of an uplink communication in the FD slot. In some aspects, the FD slot may be an IBFD slot and resources allocated for the sidelink transmission from the third UE 120-3 to the first UE 120-1 may be in the same frequency band as resources allocated for the uplink transmission from the second UE 120-2.

As shown in FIG. 9, and by reference number 905, the first UE 120-1, the second UE 120-2, and the third UE 120-3 may receive the cell-level CLI-SRS configuration. The cell-level CLI-SRS configuration may identify CLI-SRS resources, in FD slots, for CLI measurements associated with Uu and sidelink communications. The configured cell-level CLI-SRS resources may be used to transmit and/or measure the configured cell-level CLI-SRS on both Uu and sidelink. In some aspects, the CLI-SRS resources identified in the cell-level CLI-SRS configuration may include periodic CLI-SRS resources. In this case, the CLI-SRS resources may define periodic CLI-SRS occasions in which one or more UEs 120 may transmit the configured CLI-SRS in a CLI-SRS resource and one or other UEs 120 may measure CLI in connection with the transmitted CLI-SRS in the CLI-SRS resource.

The base station 110 may transmit the cell-level CLI-SRS configuration to one or more UEs 120. In some aspects, the second UE 120-2 (e.g., a Uu UE) may receive the cell-level CLI-SRS configuration from the base station 110. For example, the base station 110 may transmit the cell-level CLI-SRS configuration to the second UE 120-2 in a serving cell configuration (e.g., via an RRC message). In some aspects, the third UE 120-3 and/or the first UE 120-1 may receive the cell-level CLI-SRS configuration in a serving cell configuration (e.g., via an RRC message) from the base station 110. In some aspects, the third UE 120-3 and/or the first UE 120-1 may receive the cell-level CLI-SRS configuration, from the base station 110 or from another sidelink UE, in a sidelink resource pool configuration. In some aspects, the third UE 120-3 (e.g., the sidelink Tx UE) may receive the cell-level CLI-SRS configuration from the base station 110 (e.g., in the serving cell configuration or the sidelink resource pool configuration), and the first UE 120-1 (e.g., the sidelink Rx UE) may receive the cell-level CLI-SRS configuration from the third UE 120-3 in the sidelink resource pool configuration (e.g., in a sidelink SSB transmitted from the third UE 120-3).

In some aspects, a subset of the total set of configured CLI-SRS resources may be configured for sidelink communications (e.g., configured in a sidelink resource pool). In Mode 1, sidelink resource allocation, the base station 110 may control the configuration and assignment of the cell-level CLI-SRS resources to both Uu UEs and sidelink UEs. In Mode 2, periodic CLI-SRS resources may be configured/pre-configured in the sidelink resource pools used for sidelink resource allocation. In this case, a subset of CLI-SRS resources may be dedicated to SL only UEs operating in Mode 2.

For the sidelink UEs (e.g., the first UE 120-1 and the second UE 120-2), the cell-level CLI-SRS configuration may define CLI-SRS resources on a sidelink resource pool level. In some aspects, for each sidelink resource pool, the configuration may identify periodic CLI-SRS resources in that resource pool. For example, the configuration may indicate a periodicity for the CLI-SRS resources and a mapping of the CLI-SRS resources to dedicated symbols in sidelink slots or dedicated sidelink slots, in a sidelink resource pool, for CLI-SRS transmission. In some aspects, a sidelink resource pool may be configured with periodic CLI-SRS resources for X symbols every Y sidelink slots. For example, as shown by reference number 910, the periodic CLI-SRS resources in a sidelink resource pool may include a last X symbols dedicated for sidelink transmitting CLI-SRS (or measuring CLI) every Y sidelink slots. Such periodic CLI-SRS resources in a sidelink resource pool may define periodic CLI-SRS occasions in which UEs 120 may transmit the CLI-SRS and/or measure CLI.

As further shown in FIG. 9, and by reference number 915, the first UE 120-1 may receive a configuration of sidelink CLI measurement resources. The configuration of sidelink CLI measurement resources may be a UE-specific configuration that includes indications of whether the first UE 120-1 is to transmit a CLI-SRS or measure CLI in one or more of the CLI-SRS resources in the sidelink resource pool. In some aspects, the base station 110 may transmit the UE-specific configuration of sidelink CLI measurement resources for the first UE 120-1, and the first UE 120-1 may receive the UE-specific configuration from the base station 110. In some aspects, the third UE 120-3 may transmit the UE-specific configuration for the first UE 120-1 to the first UE 120-1. For example, the third UE 120-3 may receive the UE-specific configuration for the first UE 120-1 from the base station 110, and the first UE 120-1 may receive the UE-specific configuration for the first UE 120-1 from the third UE 120-3. Other sidelink UEs 120 (e.g., the first UE 120-1) may also receive respective UE-specific configurations of sidelink CLI measurement resources (e.g., from the base station 110 and/or from other sidelink UEs).

In some aspects, the configuration of the sidelink CLI measurement resources for a UE 120 may indicate, for one or more occurrences in the sidelink resource pool, whether the occurrence is configured as a CLI measurement resource or a CLI-SRS transmission for the UE. For example, the configuration of the sidelink CLI measurement resources may indicate that one or more occurrences of a CLI-SRS resource are configured ZP-CLI-SRS (e.g., measurement resources) and one or more occurrences of the CLI-SRS resource configured as NZP-CLI-SRS (e.g., resources in which to transmit the CLI-SRS). In some aspects, the configuration of the sidelink CLI measurement resources may configure a UE-specific pattern for using the occurrences of CLI-SRS resources in the sidelink resource pool as CLI measurement resources or resources for transmitting the CLI-SRS. For example, the configuration may include a bitmap in time that indicates the pattern of CLI measurements and CLI-SRS transmissions for the occurrences of the CLI-SRS resources in the sidelink resource pool. Additionally, or alternatively, the configuration may include indications of periodicities and/or offsets that indicate which occurrences of the CLI-SRS resources in the resource pool are to be used for CLI measurements and which occurrences of the CLI-SRS resources are to be used for CLI-SRS transmission.

In some aspects, the configuration of the sidelink CLI measurement resources may configure the occurrences of the CLI-SRS resources in the sidelink resource pool as CLI measurement resources or resources for CLI-SRS transmission at a slot level. For example, for each occurrence of a sidelink slot that includes dedicated CLI-SRS resources (e.g., every Y sidelink slots), all of the CLI-SRS resources (e.g., X dedicated CLI-SRS symbols) in the occurrence of the sidelink may be configured, for a sidelink UE 120 (e.g., the first UE 120-1 or the third UE 120-3) as CLI measurement resources or resources for CLI-SRS transmission. In some aspects the configuration of the sidelink CLI measurement resources may configure the occurrences of the CLI-SRS resources in the sidelink resource pool at a resource level. For example, a sidelink UE 120 (e.g., the first UE 120-1 or the third UE 120-3) may be configured to perform CLI measurements and/or CLI-SRS transmissions in different CLI-SRS resources in the X symbols in an occurrence of the CLI-SRS resources in the sidelink resource pool.

In some aspects, the first UE 120-1 may receive a configuration of sidelink CLI measurement resources that indicates that an occurrence of a CLI-SRS resource in the sidelink resource pool is configured as a measurement resource (e.g., ZP-CLI-SRS) for the first UE 120-1.

As further shown in FIG. 9, and by reference number 920, the base station 110 may transmit, to the second UE 120-2, an indication to transmit CLI-SRS in a CLI-SRS resource identified in the cell-level CLI-SRS configuration. For example, the CLI-SRS resource may be shared by Uu and sidelink UEs, and may be the same CLI-SRS resource for which the first UE 120-1 is configured to measure CLI. The second UE 120-2 may receive, from the base station 110, a UE-specific configuration of CLI measurement resources and/or CLI-SRS transmission resources, and the UE-specific configuration may indicate that the second UE 120-2 is to transmit the CLI-SRS in the CLI-SRS resource. For example, the UE-specific indication may configure an NZP-CLI-SRS for the CLI-SRS resource to indicate that the second UE 120-2 is to transmit the CLI-SRS.

As further shown in FIG. 9, and by reference number 925, the first UE 120-1 may receive a configuration of reporting resources for reporting the CLI measured in the CLI-SRS resource. In Mode 1, the base station 110 may configure victim UEs (e.g., the first UE 120-1) that are measuring CLI with reporting resources for reporting the measured CLI to the base station 110. In some aspects, the first UE 120-1 may receive the configuration of the reporting resources from the base station 110. In some aspects, the first UE 120-1 may be configured with periodic and/or semi-persistent PUCCH resources for reporting CLI measurements to the base station 110. In some aspects, the base station 110 may transmit, to the first UE 120-1, DCI (e.g., DCI 3_x) that includes a CLI request field for triggering transmission of an aperiodic CLI report from the first UE 120-1 to the base station 110. In some aspects, the first UE 120-1 may receive the configuration of the reporting resources from the third UE 120-3 (e.g., the Tx UE). In some aspects, such as in a case in which the first UE 120-1 is not capable of Uu communications and/or the first UE 120-1 is not in a coverage area of the base station 110, the first UE 120-1 may be configured to report CLI measurements to the third UE 120-3. In this case, the third UE 120-3 may transmit the CLI measurements to the base station 110.

In Mode 2, the first UE 120-1 may be configured with periodic and/or semi-persistent resources for reporting the CLI measurements via sidelink communications. In some aspects, sidelink UEs 120 (e.g., the first UE 120-1) may be configured with dedicated resources for CLI reporting, similar to dedicated feedback (e.g., PSFCH) resources configured for sidelink UEs 120. In some aspects, periodic reporting resources may be configured on dedicated symbols in sidelink slots in the sidelink resource pool. For example, X symbols may be dedicated to CLI reporting every Y slots in the sidelink resource pool. In some aspects, the base station 110 may configure one or more sidelink UEs 120 (e.g., the third UE 120-3 and/or the first UE 120-1) with Uu and sidelink capabilities to aggregate CLI measurements from other sidelink UEs 120 and report the CLI measurements to the base station 110 in an uplink communication.

As further shown in FIG. 9, and by reference number 930, the second UE 120-2 may transmit the CLI-SRS in the CLI-SRS resource based at least in part on the indication for the second UE 120-2 to transmit the CLI-SRS in the CLI-SRS resource. The second UE 120-2 may transmit the CLI-SRS in the cell-level CLI-SRS resource (e.g., time and frequency resource) according to the cell-level CLI-SRS configuration. In some aspects, the second UE 120-2 may be operating in the Uu communication mode (e.g., the second UE 120-2 is configured with resources for transmitting an uplink communication), and the second UE 120-2 may transmit the CLI-SRS to the base station 110 (e.g., in a beam direction associated with the uplink communication configured/scheduled for the second UE 120-2).

As further shown in FIG. 9, and by reference number 935, the first UE 120-1 may measure CLI, in the CLI-SRS resource (e.g., the CLI-SRS occasion), in connection with the CLI-SRS transmission from the second UE 120-2. The first UE 120-1 may measure the CLI in the CLI-SRS resource based at least in part on the indication (e.g., in the configuration of sidelink CLI measurement resources) for the first UE 120-1 to measure CLI in the CLI-SRS resource. In some aspects, the first UE 120-1 may measure the RSRP at the first UE 120-1 from the CLI-SRS transmitted in the CLI-SRS resource by the second UE 120-2 (e.g., and from any other CLI-SRS transmissions in the CLI-SRS resource). Additionally, or alternatively, the first UE 120-1 may measure the RSSI (e.g., CLI-RSSI) from the CLI-SRS transmitted by the second UE 120-2 (e.g., and from any other CLI-SRS transmissions in the CLI-SRS resource). In some aspects, the first UE 120-1 may measure the CLI in connection with the CLI-SRS transmission from the second UE 120-2 in order to measure the CLI from an uplink transmission by the second UE 120-2 on a sidelink reception by the first UE 120-1 (e.g., in the same frequency band in an IBFD slot).

As further shown in FIG. 9, and by reference number 940, the first UE 120-1 may transmit, to the base station 110 and/or to the third UE 120-3, an indication of the measured CLI. The first UE 120-1 may report the measured CLI to the third UE 120-3 and/or the base station 110 based at least in part on the configuration of reporting resources. In some aspects, the first UE 120-1 may transmit the indication of the measured CLI to the base station 110 in periodic and/or semi-persistent PUCCH resources configured for reporting CLI measurements. In some aspects, the first UE 120-1 may transmit, to base station 110, an aperiodic CLI report that includes the measured CLI based at least in part on receiving, from the base station 110, DCI (e.g., DCI 3_x) that includes a CLI request field for triggering the transmission of the aperiodic CLI report. In some aspects, the first UE 120-1 may transmit an indication of the measured CLI to the third UE 120-3. In this case, the third UE 120-3 may transmit the CLI measurements to the base station 110.

In some aspects, such as in Mode 2 operation, the first UE 120-1 may transmit an indication of the measured CLI to the third UE 120-3 on periodic and/or semi-persistent resources configured for reporting the CLI measurements via sidelink communications. In some aspects, the first UE 120-1 transmit the indication of the measured CLI to the third UE 120-3 via dedicated resources for CLI reporting, similar to dedicated feedback (e.g., PSFCH) resources configured for sidelink UEs 120. In some aspects, the first UE 120-1 may transmit the indication of the measured CLI via a periodic reporting resource, dedicated to CLI reporting, that is configured in the sidelink resource pool.

In some aspects, the first UE 120-1 may transmit the indication of the measured CLI to a sidelink UE 120 (e.g., the third UE 120-3) that is configured to aggregate CLI measurements from one or more sidelink UEs 120 and transmit the aggregated CLI measurements to the base station 110. In some aspects, the first UE 120-1 (or the third UE 120-3), based at least in part on a configuration received from the base station 110, may aggregate CLI measurements from one or more other sidelink UEs 120 and transmit the CLI measurements to the base station 110 in an uplink communication.

As further shown in FIG. 9, and by reference number 945, the third UE 120-3 may transmit, to the first UE 120-1, a sidelink communication in an FD slot. The first UE 120-1 may receive the sidelink communication from the third UE 120-3. As shown by reference number 950, the second UE 120-2 may transmit an uplink communication to the base station 110 in the FD slot. In some aspects, the FD slot may be an IBFD slot, and the second UE 120-2 may transmit the uplink communication in the same frequency band as the sidelink communication from the third UE 120-3 to the first UE 120-1 in the IBFD slot.

In some aspects, the base station 110 may adjust the uplink transmission by the second UE 120-2 and/or the sidelink transmission (e.g., in Mode 1) from the third UE 120-3 to the first UE 120-1 based at least in part on the indication of the measured CLI received from the first UE 120-1. For example, the base station 110 may adjust the transmission power of the uplink transmission from the second UE 120-2 and/or the sidelink transmission from the third UE 120-3 (e.g., in Mode 1), the allocated frequency and/or time resources for the uplink communication and/or the sidelink communication, and/or the beam direction for the uplink communication and/or the sidelink communication to reduce the CLI from the uplink or sidelink transmission by the second UE 120-2 on the downlink reception at the first UE 120-1. As a result, reliability of the sidelink reception by the first UE 120-1 may be increased.

As indicated above, FIG. 9 is provided as an example. Other examples may differ from what is described with respect to FIG. 9.

Figure 10:
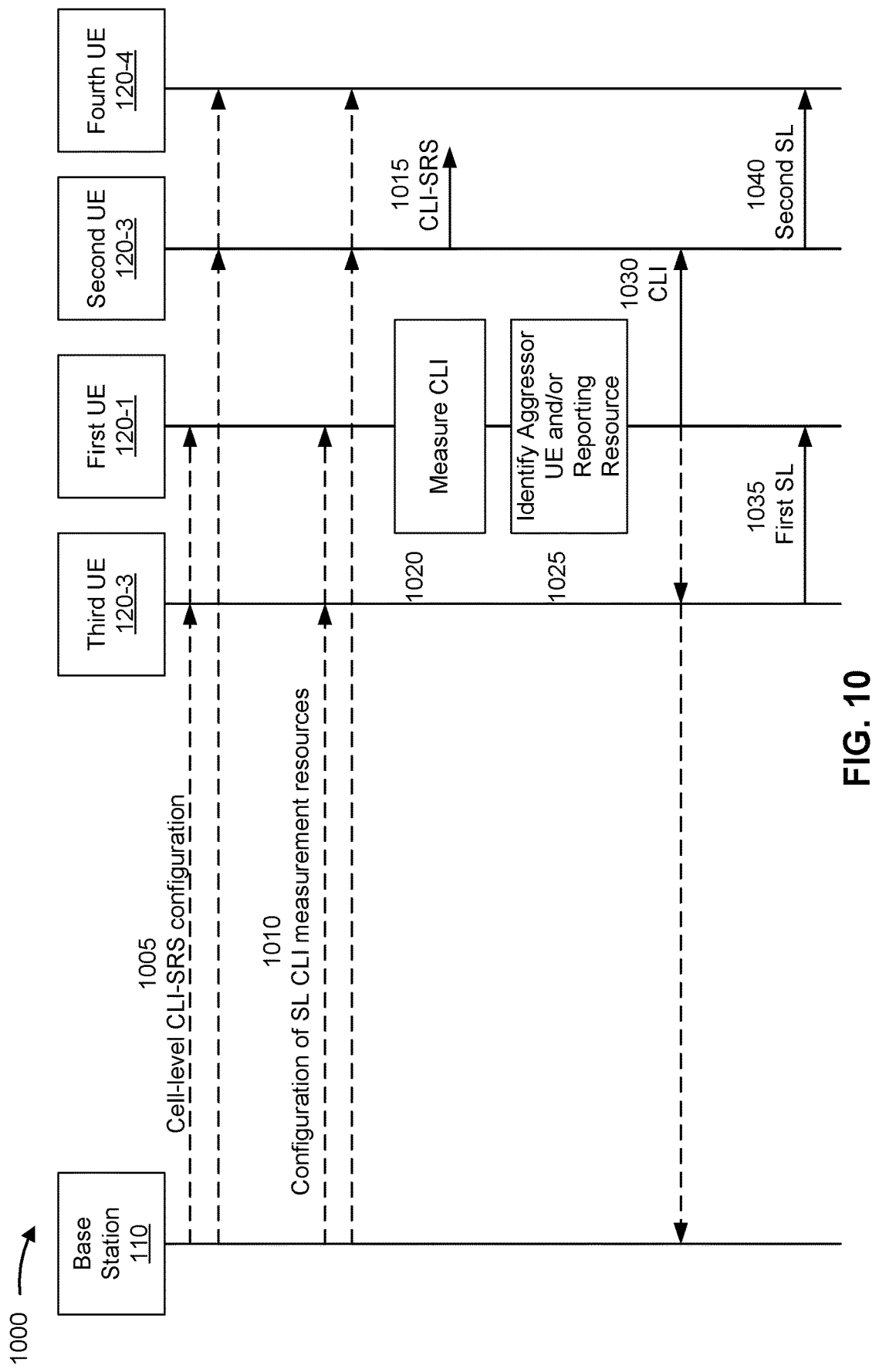

FIG. 10 is a diagram illustrating an example 1000 associated with measuring CLI using a cell-level CLI-SRS, in accordance with the present disclosure. As shown in FIG. 10, example 1000 includes a base station 110 and one or more UEs 120, including a first UE 120-1, a second UE 120-2, a third UE 120-3, and a fourth UE 120-4. In some aspects, the base station 110 and the UEs 120 may be included in a wireless network, such as wireless network 100. The base station 110 may communicate with the UEs 120 via a wireless access link, which may include an uplink and a downlink. The first UE 120-1, the second UE 120-2, the third UE 120-3, and/or the fourth UE 120-4 may communicate via sidelink.

In example 1000, the first UE 120-1 and the third UE 120-3 may be sidelink UEs with resources allocated for a sidelink communication between the third UE 120-3 and the first UE 120-1. For example, the third UE 120-3 may be a Tx UE for a first sidelink communication, and the first UE 120-1 may be an Rx UE for the first sidelink communication. In example 1000, the second UE 120-2 and the fourth UE 120-4 may be sidelink UEs with resources allocated for a sidelink communication between the second UE 120-2 and the fourth UE 120-4. For example, the second UE 120-2 may be a Tx UE for a second sidelink communication, and the fourth UE 120-4 may be an Rx UE for the second sidelink communication.

As shown in FIG. 10, and by reference number 1005, the first UE 120-1, the second UE 120-2, the third UE 120-3, and/or the fourth UE 120-4 may receive the cell-level CLI-SRS configuration. The cell-level CLI-SRS configuration may identify CLI-SRS resources, in FD slots, for CLI measurements associated with Uu and sidelink communications. The configured cell-level CLI-SRS resources may be used to transmit and/or measure the configured cell-level CLI-SRS on both Uu and sidelink.

The base station 110 may transmit the cell-level CLI-SRS configuration to one or more of the UEs 120. In some aspects, one or more of the UEs 120 may receive the cell-level CLI-SRS configuration from the base station 110 in a serving cell configuration (e.g., via an RRC message). In some aspects, one or more of the UEs 120 may receive the cell-level CLI-SRS configuration, from the base station 110 or from another sidelink UE 120, in a sidelink resource pool configuration. In some aspects, the third UE 120-3 (e.g., a sidelink Tx UE) may receive the cell-level CLI-SRS configuration from the base station 110, and the first UE 120-1 (e.g., a sidelink Rx UE) may receive the cell-level CLI-SRS configuration from the third UE 120-3. In some aspects, the second UE 120-2 (e.g., a sidelink Tx UE) may receive the cell-level CLI-SRS configuration from the base station 110, and the fourth UE 120-4 (e.g., a sidelink Rx UE) may receive the cell-level CLI-SRS configuration from the second UE 120-2.

In some aspects, a subset of the total set of configured CLI-SRS resources may be configured for sidelink communications (e.g., configured in a sidelink resource pool). For example, the cell-level CLI-SRS configuration may identify periodic CLI-SRS resources in one or more sidelink resource pools configured for SL UEs (e.g., the first UE 120-1, the second UE 120-2, the third UE 120-3, and the fourth UE 120-4), as described elsewhere herein. Such periodic CLI-SRS resources in a sidelink resource pool may define periodic CLI-SRS occasions in which the UEs 120 may transmit the CLI-SRS and/or measure CLI.

As further shown in FIG. 10, and by reference number 1010, the first UE 120-1, the second UE 120-2, the third UE 120-3, and/or the fourth UE 120-4 may each receive a respective configuration of sidelink CLI measurement resources. The configuration of sidelink CLI measurement resources may be a UE-specific configuration that includes indications of whether the UE 120 is to transmit a CLI-SRS or measure CLI in one or more of the CLI-SRS resources in the sidelink resource pool. In some aspects, one or more of the UEs 120 may receive the respective UE-specific configurations of sidelink CLI measurement resources from the base station 110. In some aspects, the third UE 120-3 may transmit the UE-specific configuration for the first UE 120-1 to the first UE 120-1, and/or the second UE 120-2 may transmit the UE-specific configuration for the fourth UE 120-4 to the fourth UE 120-4.

In some aspects, the configuration of the sidelink CLI measurement resources for a UE 120 may indicate, for one or more occurrences in the sidelink resource pool, whether the occurrence is configured as a CLI measurement resource or a CLI-SRS transmission for the UE 120. For example, the configuration of the sidelink CLI measurement resources may indicate that one or more occurrences of a CLI-SRS resource are configured as ZP-CLI-SRS (e.g., measurement resources) and one or more occurrences of the CLI-SRS resource are configured as NZP-CLI-SRS (e.g., resources in which to transmit the CLI-SRS). In some aspects, the configuration of the sidelink CLI measurement resources may configure a UE-specific pattern for using the occurrences of CLI-SRS resources in the sidelink resource pool as CLI measurement resources or resources for transmitting the CLI-SRS. For example, the configuration may include a bitmap in time that indicates the pattern of CLI measurements and CLI-SRS transmissions for the occurrences of the CLI-SRS resources in the sidelink resource pool. Additionally, or alternatively, the configuration may include indications of periodicities and/or offsets that indicate which occurrences of the CLI-SRS resources in the resource pool are to be used for CLI measurements and which occurrences of the CLI-SRS resources are to be used for CLI-SRS transmission.

In some aspects, the configuration of the sidelink CLI measurement resources may configure the occurrences of the CLI-SRS resources in the sidelink resource pool as CLI measurement resources or resources for CLI-SRS transmission at a slot level, as described elsewhere herein. In some aspects the configuration of the sidelink CLI measurement resources may configure the occurrences of the CLI-SRS resources in the sidelink resource pool at a resource level, as described elsewhere herein.

In some aspects, the first UE 120-1 may receive a configuration of sidelink CLI measurement resources that indicates that an occurrence of a CLI-SRS resource in the sidelink resource pool is configured as a measurement resource (e.g., ZP-CLI-SRS) for the first UE 120-1. In some aspects, the second UE 120-2 may receive a configuration of sidelink CLI measurement resources that indicates that the occurrence of the CLI-SRS resource in the sidelink resource pool is configured as a transmission resource (e.g., NZP-CLI-SRS) for the second UE 120-2.

As further shown in FIG. 10, and by reference number 1015, the second UE 120-2 may transmit the CLI-SRS in the CLI-SRS resource based at least in part on the indication for the second UE 120-2 to transmit the CLI-SRS in the CLI-SRS resource. The second UE 120-2 may transmit the CLI-SRS in the cell-level CLI-SRS resource (e.g., time and frequency resource) according to the cell-level CLI-SRS configuration. In some aspects, the second UE 120-2 may be operating in a sidelink communication mode (e.g., the second UE 120-2 is configured with resources for transmitting a sidelink communication to the fourth UE 120-4), and the second UE 120-2 may transmit the CLI-SRS in a beam direction toward the Rx UE (e.g., in a beam direction associated with the sidelink communication to be transmitted from the second UE 120-2 to the fourth UE 120-4).

As further shown in FIG. 10, and by reference number 1020, the first UE 120-1 may measure CLI, in the CLI-SRS resource, in connection with the CLI-SRS transmission from the second UE 120-2. The first UE 120-1 may measure the CLI in the CLI-SRS resource based at least in part on the indication (e.g., in the configuration of sidelink CLI measurement resources) for the first UE 120-1 to measure CLI in the CLI-SRS resource. In some aspects, the first UE 120-1 may measure the RSRP at the first UE 120-1 from the CLI-SRS transmitted in the CLI-SRS resource by the second UE 120-2 (e.g., and from any other CLI-SRS transmissions in the CLI-SRS resource). Additionally, or alternatively, the first UE 120-1 may measure the RSSI (e.g., CLI-RSSI) from the CLI-SRS transmitted by the second UE 120-2 (e.g., and from any other CLI-SRS transmissions in the CLI-SRS resource). In some aspects, the first UE 120-1 may measure the CLI in connection with the CLI-SRS transmission from the second UE 120-2 in order to measure the CLI from a sidelink transmission by the second UE 120-2 on a sidelink reception by the first UE 120-1.

As further shown in FIG. 10, and by reference number 1025, the first UE 120-1 may identify the aggressor UE (e.g., the second UE 120-2) and/or a reporting resource associated with the CLI measurement. As shown by reference number 1030, the first UE 120-1 may transmit an indication of the measured CLI to the aggressor UE (e.g., the second UE 120-2). For example, the first UE 120-1 may transmit the indication of the measured CLI to the aggressor UE based at least in part on identifying the aggressor UE and/or the reporting resource associated with the CLI measurement. In some aspects, the first UE 120-1 may be configured with a mapping between the CLI-SRS resource, in which the first UE 120-1 measured the CLI, and a sidelink identifier (ID) of the UE (e.g., the second UE 120-2) that was configured to transmit the CLI-SRS in the CLI-SRS resource. In this case, the first UE 120-1 may determine the sidelink ID of the aggressor UE (e.g., the second UE 120-2) based at least in part on the CLI-SRS resource in which the CLI is measured by the first UE 120-1. In some aspects, based at least in part on determining the sidelink ID of the aggressor UE, the first UE 120-1 may transmit the indication of the measured CLI to the aggressor UE (e.g., the second UE 120-2).

In some aspects, the first UE 120-1 may be configured with a mapping between CLI-SRS resources and CLI reporting resources. For example, each CLI-SRS resource may be associated with a respective CLI resource. In this case, each CLI reporting resource may be associated with the UE 120 configured to transmit the CLI-SRS on the CLI-SRS resource associated with that CLI reporting resource. The first UE 120-1 may identify the CLI reporting resource associated with the CLI-SRS resource in which the first UE 120-1 measured the CLI. The first UE 120-1 may then transmit the indication of the measured CLI using the associated CLI reporting resource in order to transmit the indication of the measured CLI to the aggressor UE (e.g., the second UE 120-2) that transmitted the CLI-SRS in the CLI-SRS resource. For example, this may allow the first UE 120-1 to report the CLI measurement to the aggressor UE (e.g., the second UE 120-2) without knowing the sidelink ID of the aggressor UE.

In some aspects, the first UE 120-1 may use inter-UE coordination messages to identify the aggressor UE. For example, in some aspects, the first UE 120-1 may measure the CLI in the CLI-SRS resource, and then the first UE 120-1 may transmit to one or more other sidelink UEs (e.g., including the second UE 120-2) inter-UE coordination messages requesting which UE (or UEs) transmitted the CLI-SRS in the CLI-SRS resource. The second UE 120-2 may transmit, to the first UE 120-1, an inter-UE coordination message that indicates that the second UE 120-2 transmitted the CLI-SRS in the CLI-SRS resource in which the CLI was measured by the first UE 120-1. In some aspects, based at least in part on receiving the indication from the second UE 120-2, the first UE 120-1 may transmit the indication of the measured CLI to the second UE 120-2.

In some aspects, multiple UEs 120 (e.g., including the second UE 120-2) may be configured to transmit the CLI-SRS in the CLI-SRS resource measured by the first UE 120-1. In this case, the first UE 120-1 may measure the CLI from the multiple UEs 120 to determine whether CLI exists or not for the first UE 120-1. Based at least in part on the measurement of CLI satisfying a threshold, the first UE 120-1 may coordinate, via inter-UE coordination message, with the UEs 120 that transmitted the CLI-SRS in the CLI-SRS resource to determine which UE 120 (or UEs) is the aggressor UE that is causing the CLI. For example, the first UE 120-1 may receive an indication of upcoming CLI-SRS resources in which the other UEs 120 are configured to transmit the CLI-SRS, and the first UE 120-1 may measure CLI from individual ones of the other UEs 120 in respective upcoming CLI-SRS resources configured for the other UEs 120. In some aspects, the second UE 120-2 may transmit, to the first UE 120-1, an inter-UE coordination message that indicates a CLI-SRS resource (e.g., an upcoming CLI-SRS resource) in which the second UE 120-2 is configured to transmit the CLI-SRS. The first UE 120-1 may measure CLI in the CLI-SRS resource based at least in part on receiving the indication from the second UE 120-2. The first UE 120-1 may then transmit, to the second UE 120-2, the measured CLI from the CLI-SRS transmitted by the second UE 120-2.

In some aspects, such as in Mode 1 operation, the first UE 120-1 may transmit the indication of the measured CLI to the base station 110 (e.g., in a reporting resource configured for the first UE 120-1). For example, the first UE 120-1 may transmit the indication of the measured CLI to the base station 110 in addition to, or instead of, transmitting the indication of the measured CLI to the aggressor UE.

As further shown in FIG. 10, and by reference number 1035, the third UE 120-3 may transmit, to the first UE 120-1, a first sidelink communication. The first UE 120-1 may receive the first sidelink communication from the third UE 120-3. As shown by reference number 1040, the second UE 120-2 may transmit, to the fourth UE 120-4, a second sidelink communication. In some aspects, the second UE 120-2 may transmit the second sidelink communication in a same sub-channel or an adjacent sub-channel as the first sidelink communication from the third UE 120-3 to the first UE 120-1, and in the same slot as the first sidelink communication from the third UE 120-3 to the first UE 120-1.

In some aspects (e.g., in Mode 2 operation), the second UE 120-2 (e.g., the aggressor UE) may adapt a Tx beam and/or a Tx power of the second sidelink communication based at least in part on the measured CLI to reduce the CLI from the transmission of the second sidelink communication by the second UE 120-2 on the reception of the first sidelink communication by the first UE 120-1. For example, the second UE 120-2 may determine a Tx power back-off to reduce the CLI based at least in part on priorities associated with the first and second sidelink communications and the measured CLI.

In some aspects (e.g., in Mode 1 operation), the base station 110 may adjust and/or determine a resource allocation for sidelink communications based at least in part on the measure CLI. In some aspects, the base station 110 may use CLI measurements to group sidelink UEs 120 and effectively utilize sidelink resources. For example, the base station 110 may determine, based at least in part on one or more CLI measurements, whether the same frequency resource can be used for simultaneous sidelink transmissions by multiple UEs 120 without causing significant CLI.

As indicated above, FIG. 10 is provided as an example. Other examples may differ from what is described with respect to FIG. 10.

Figure 11:
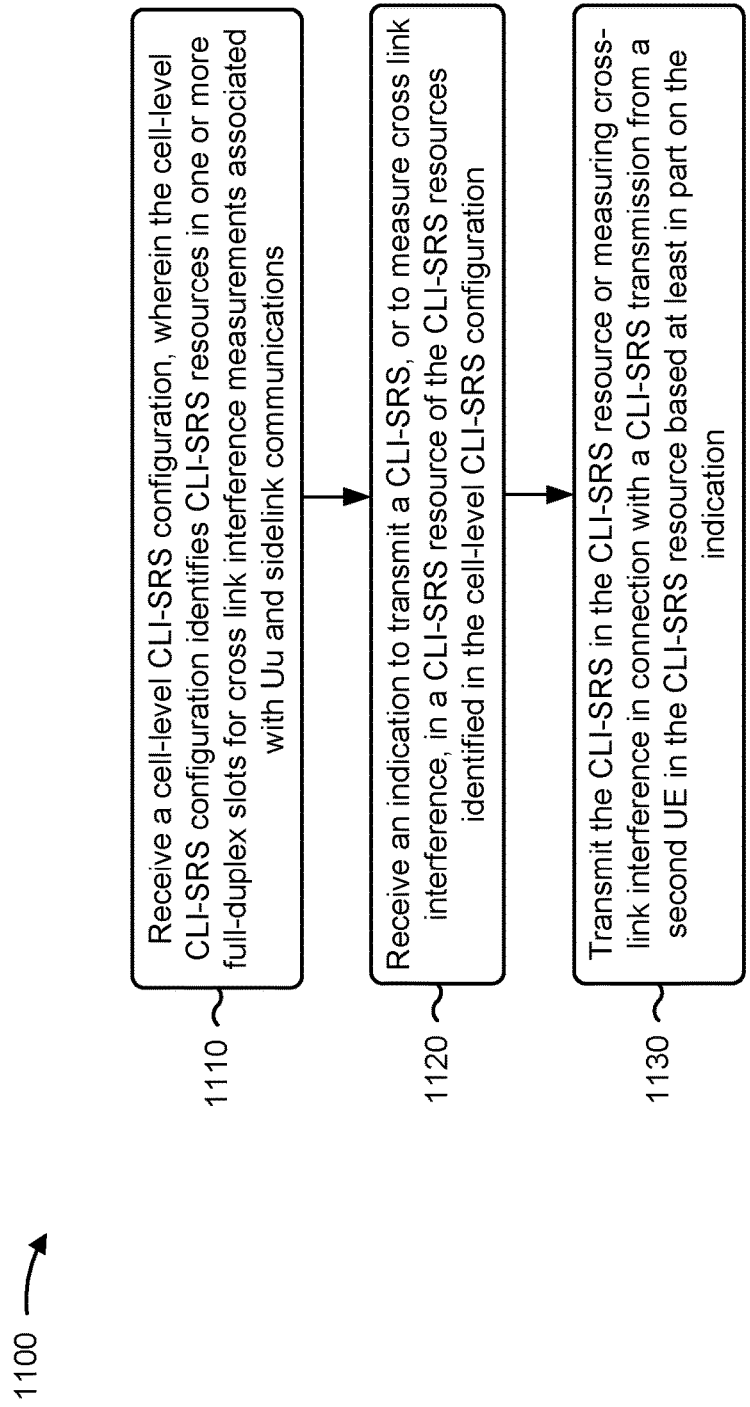
FIGS. 11-12 are diagrams illustrating example processes associated with measuring CLI using a cell-level CLI-SRS, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with measuring CLI using a cell-level CLI-SRS.

As shown in FIG. 11, in some aspects, process 1100 may include receiving a cell-level CLI-SRS configuration, wherein the cell-level CLI-SRS configuration identifies CLI-SRS resources in one or more full-duplex slots for cross link interference measurements associated with Uu and sidelink communications (block 1110). For example, the UE (e.g., using communication manager 140 and/or reception component 1302, depicted in FIG. 13) may receive a cell-level CLI-SRS configuration, wherein the cell-level CLI-SRS configuration identifies CLI-SRS resources in one or more full-duplex slots for cross link interference measurements associated with Uu and sidelink communications, as described above.

As further shown in FIG. 11, in some aspects, process 1100 may include receiving an indication to transmit a CLI-SRS, or to measure cross link interference, in a CLI-SRS resource of the CLI-SRS resources identified in the cell-level CLI-SRS configuration (block 1120). For example, the UE (e.g., using communication manager 140 and/or reception component 1302, depicted in FIG. 13) may receive an indication to transmit a CLI-SRS, or to measure cross link interference, in a CLI-SRS resource of the CLI-SRS resources identified in the cell-level CLI-SRS configuration, as described above.

As further shown in FIG. 11, in some aspects, process 1100 may include transmitting the CLI-SRS in the CLI-SRS resource or measuring cross-link interference in connection with a CLI-SRS transmission from a second UE in the CLI-SRS resource based at least in part on the indication (block 1130). For example, the UE (e.g., using communication manager 140, transmission component 1304, and/or measurement component 1308, depicted in FIG. 13) may transmit the CLI-SRS in the CLI-SRS resource or measure cross-link interference in connection with a CLI-SRS transmission from a second UE in the CLI-SRS resource based at least in part on the indication, as described above.

Process 1100 may include additional aspects, such as any single aspect or any combination of aspects described below and/or in connection with one or more other processes described elsewhere herein.

In a first aspect, receiving the cell-level CLI-SRS configuration includes receiving a serving cell configuration that includes the cell-level CLI-SRS configuration.

In a second aspect, alone or in combination with the first aspect, receiving the cell-level CLI-SRS configuration includes receiving a sidelink resource pool configuration that includes the cell-level CLI-SRS configuration.

In a third aspect, alone or in combination with one or more of the first and second aspects, the CLI-SRS resources identified by the cell-level CLI-SRS configuration include periodic CLI-SRS resources.

In a fourth aspect, alone or in combination with one or more of the first through third aspects, the cell-level CLI-SRS configuration includes a configuration of periodic CLI-SRS resources in a sidelink resource pool.

In a fifth aspect, alone or in combination with one or more of the first through fourth aspects, receiving the indication includes receiving the indication to measure cross link interference in the CLI-SRS resource, and transmitting the CLI-SRS in the CLI-SRS resource or measuring cross-link interference includes measuring cross link interference in connection with the CLI-SRS transmission from the second UE in the CLI-SRS resource.

In a sixth aspect, alone or in combination with one or more of the first through fifth aspects, receiving the indication to measure cross link interference in the CLI-SRS resource includes receiving, from a base station, a configuration of a ZP-CLI-SRS for the CLI-SRS resource.

In a seventh aspect, alone or in combination with one or more of the first through sixth aspects, measuring cross link interference in connection with the CLI-SRS transmission from the second UE in the CLI-SRS resource includes measuring cross link interference from a sidelink or uplink transmission by the second UE on downlink reception by the first UE based at least in part on the CLI-SRS transmission from the second UE in the CLI-SRS resource.

In an eighth aspect, alone or in combination with one or more of the first through seventh aspects, process 1100 includes transmitting, to a base station, an indication of the cross link interference measured in the CLI-SRS resource.

In a ninth aspect, alone or in combination with one or more of the first through eighth aspects, the CLI-SRS resource is a periodic CLI-SRS configured for a sidelink resource pool, and receiving the indication to measure cross link interference in the CLI-SRS resource includes receiving a configuration of sidelink cross link interference measurement resources that indicates that an occurrence of the CLI-SRS in the sidelink resource pool is configured as a cross link interference measurement resource for the UE.

In a tenth aspect, alone or in combination with one or more of the first through ninth aspects, measuring cross link interference in connection with the CLI-SRS transmission from the second UE in the CLI-SRS resource includes measuring cross link interference from an uplink transmission by the second UE on sidelink reception at the first UE based at least in part on the CLI-SRS transmission from the second UE.

In an eleventh aspect, alone or in combination with one or more of the first through tenth aspects, process 1100 includes receiving, from a base station, a configuration of periodic or semi-persistent uplink resources for reporting cross link interference measurements, and transmitting, to the base station, an indication of the cross link interference measured in the CLI-SRS resource using the periodic or semi-persistent uplink resources.

In a twelfth aspect, alone or in combination with one or more of the first through eleventh aspects, process 1100 includes receiving, from a base station, an indication for triggering an aperiodic cross link interference report, and transmitting, to the base station, the aperiodic cross link interference report including an indication of the cross link interference measured in the CLI-SRS resource based at least in part on receiving the indication for triggering the aperiodic cross link interference report.

In a thirteenth aspect, alone or in combination with one or more of the first through twelfth aspects, process 1100 includes transmitting, to a transmitting UE associated with the sidelink reception at the first UE, an indication of the cross link interference measured in the CLI-SRS resource.

In a fourteenth aspect, alone or in combination with one or more of the first through thirteenth aspects, process 1100 includes transmitting an indication of the cross link interference measured in the CLI-SRS resource using a configured periodic or semi-persistent sidelink resource cross link interference reporting resource in the sidelink resource pool.

In a fifteenth aspect, alone or in combination with one or more of the first through fourteenth aspects, measuring cross link interference in connection with the CLI-SRS transmission from the second UE in the CLI-SRS resource includes measuring cross link interference from sidelink transmission by the second UE on sidelink reception at the first UE based at least in part on the CLI-SRS transmission from the second UE in the CLI-SRS resource.

In a sixteenth aspect, alone or in combination with one or more of the first through fifteenth aspects, process 1100 includes determining a sidelink identifier for the second UE based at least in part on a mapping between the CLI-SRS resource and the sidelink identifier, and transmitting an indication of the cross link interference measured in the CLI-SRS resource to the second UE based at least in part on the sidelink identifier for the second UE.

In a seventeenth aspect, alone or in combination with one or more of the first through sixteenth aspects, process 1100 includes transmitting an indication of the cross link interference measured in the CLI-SRS resource on a cross link interference reporting resource associated with the CLI-SRS resource.

In an eighteenth aspect, alone or in combination with one or more of the first through seventeenth aspects, process 1100 includes receiving, via an inter-UE coordination message from the second UE, an indication that the CLI-SRS resource is associated with the second UE, wherein measuring the cross link interference from the sidelink transmission by the second UE on the sidelink reception at the first UE is based at least in part on receiving the indication that the CLI-SRS resource is associated with the second UE, and transmitting, via an inter-UE coordination message to the second UE, an indication of the cross link interference measured in the CLI-SRS resource.

In a nineteenth aspect, alone or in combination with one or more of the first through eighteenth aspects, receiving the indication includes receiving the indication to transmit the CLI-SRS in the CLI-SRS resource, and transmitting the CLI-SRS in the CLI-SRS resource or measuring cross-link interference includes transmitting the CLI-SRS in the CLI-SRS resource.

In a twentieth aspect, alone or in combination with one or more of the first through nineteenth aspects, receiving the indication to transmit the CLI-SRS in the CLI-SRS resource includes receiving, from a base station, a configuration of an NZP-CLI-SRS for the CLI-SRS resource.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
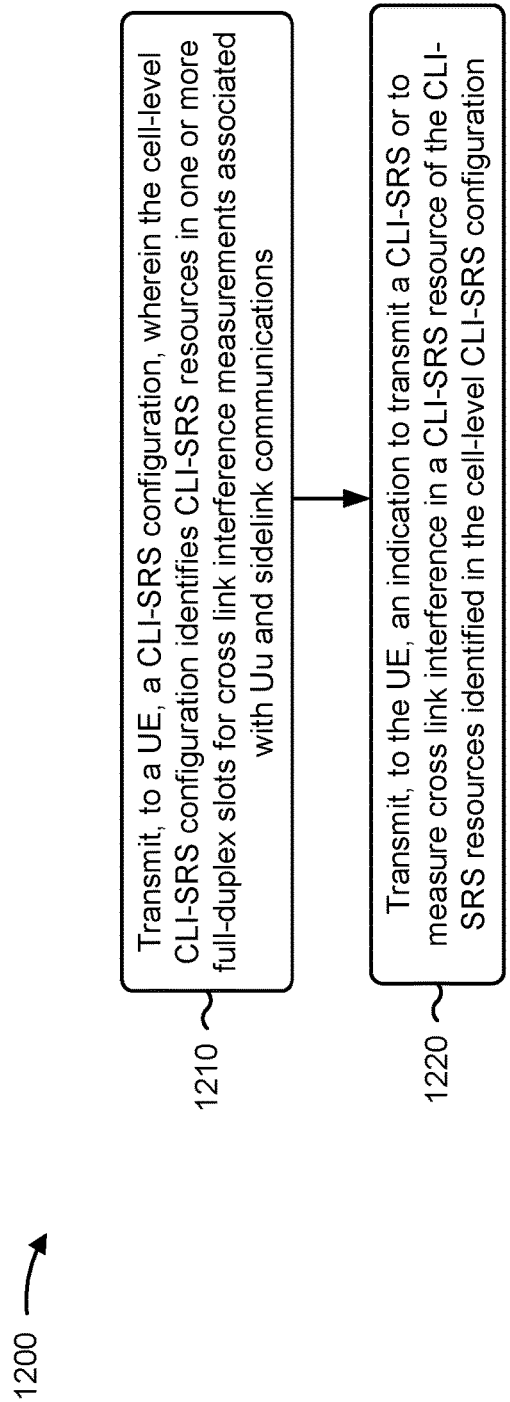

FIG. 12 is a diagram illustrating an example process 1200 performed, for example, by a base station, in accordance with the present disclosure. Example process 1200 is an example where the base station (e.g., base station 110) performs operations associated with measuring CLI using a cell-level CLI-SRS.

As shown in FIG. 12, in some aspects, process 1200 may include transmitting, to a UE, a cell-level CLI-SRS configuration, wherein the cell-level CLI-SRS configuration identifies CLI-SRS resources in one or more full-duplex slots for cross link interference measurements associated with Uu and sidelink communications (block 1210). For example, the base station (e.g., using communication manager 150 and/or transmission component 1404, depicted in FIG. 14) may transmit, to a UE, a cell-level CLI-SRS configuration, wherein the cell-level CLI-SRS configuration identifies CLI-SRS resources in one or more full-duplex slots for cross link interference measurements associated with Uu and sidelink communications, as described above.

As further shown in FIG. 12, in some aspects, process 1200 may include transmitting, to the UE, an indication to transmit a CLI-SRS or to measure cross link interference in a CLI-SRS resource of the CLI-SRS resources identified in the cell-level CLI-SRS configuration (block 1220). For example, the base station (e.g., using communication manager 150 and/or transmission component 1404, depicted in FIG. 14) may transmit, to the UE, an indication to transmit a CLI-SRS or to measure cross link interference in a CLI-SRS resource of the CLI-SRS resources identified in the cell-level CLI-SRS configuration, as described above.

Process 1200 may include additional aspects, such as any single aspect or any combination of aspects described below and/or in connection with one or more other processes described elsewhere herein.

In a first aspect, transmitting the cell-level CLI-SRS configuration includes transmitting, to the UE, a serving cell configuration that includes the cell-level CLI-SRS configuration.

In a second aspect, alone or in combination with the first aspect, transmitting the cell-level CLI-SRS configuration includes transmitting, to the UE, a sidelink resource pool configuration that includes the cell-level CLI-SRS configuration.

In a third aspect, alone or in combination with one or more of the first and second aspects, the CLI-SRS resources identified by the cell-level CLI-SRS configuration include periodic CLI-SRS resources.

In a fourth aspect, alone or in combination with one or more of the first through third aspects, the cell-level CLI-SRS configuration includes a configuration of periodic CLI-SRS resources in a sidelink resource pool.

In a fifth aspect, alone or in combination with one or more of the first through fourth aspects, transmitting the indication includes transmitting, to the UE, the indication to measure cross link interference in the CLI-SRS resource.

In a sixth aspect, alone or in combination with one or more of the first through fifth aspects, transmitting the indication to measure cross link interference in the CLI-SRS resource includes transmitting, to the UE, a configuration of ZP-CLI-SRS for the CLI-SRS resource.

In a seventh aspect, alone or in combination with one or more of the first through sixth aspects, process 1200 includes receiving, from the UE, an indication of the cross link interference measured in the CLI-SRS resource.

In an eighth aspect, alone or in combination with one or more of the first through seventh aspects, the CLI-SRS resource is a periodic CLI-SRS configured for a sidelink resource pool, and transmitting the indication to measure the cross link interference in the CLI-SRS resource includes transmitting, to the UE, a configuration of sidelink cross link interference measurement resources that indicates that an occurrence of the CLI-SRS in the sidelink resource pool is configured as a cross link interference measurement resource for the UE.

In a ninth aspect, alone or in combination with one or more of the first through eighth aspects, process 1200 includes transmitting, to the UE, a configuration of periodic or semi-persistent uplink resources for reporting cross link interference measurements, and receiving, from the UE, an indication of the cross link interference measured in the CLI-SRS resource using the periodic or semi-persistent uplink resources.

In a tenth aspect, alone or in combination with one or more of the first through ninth aspects, process 1200 includes transmitting, to the UE, an indication for triggering an aperiodic cross link interference report, and receiving, from the UE, the aperiodic cross link interference report including an indication of the cross link interference measured in the CLI-SRS resource.

In an eleventh aspect, alone or in combination with one or more of the first through tenth aspects, transmitting the indication includes transmitting, to the UE, the indication to transmit the CLI-SRS in the CLI-SRS resource.

In a twelfth aspect, alone or in combination with one or more of the first through eleventh aspects, transmitting the indication to transmit the CLI-SRS in the CLI-SRS resource includes transmitting, to the UE, a configuration of an NZP-CLI-SRS for the CLI-SRS resource.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
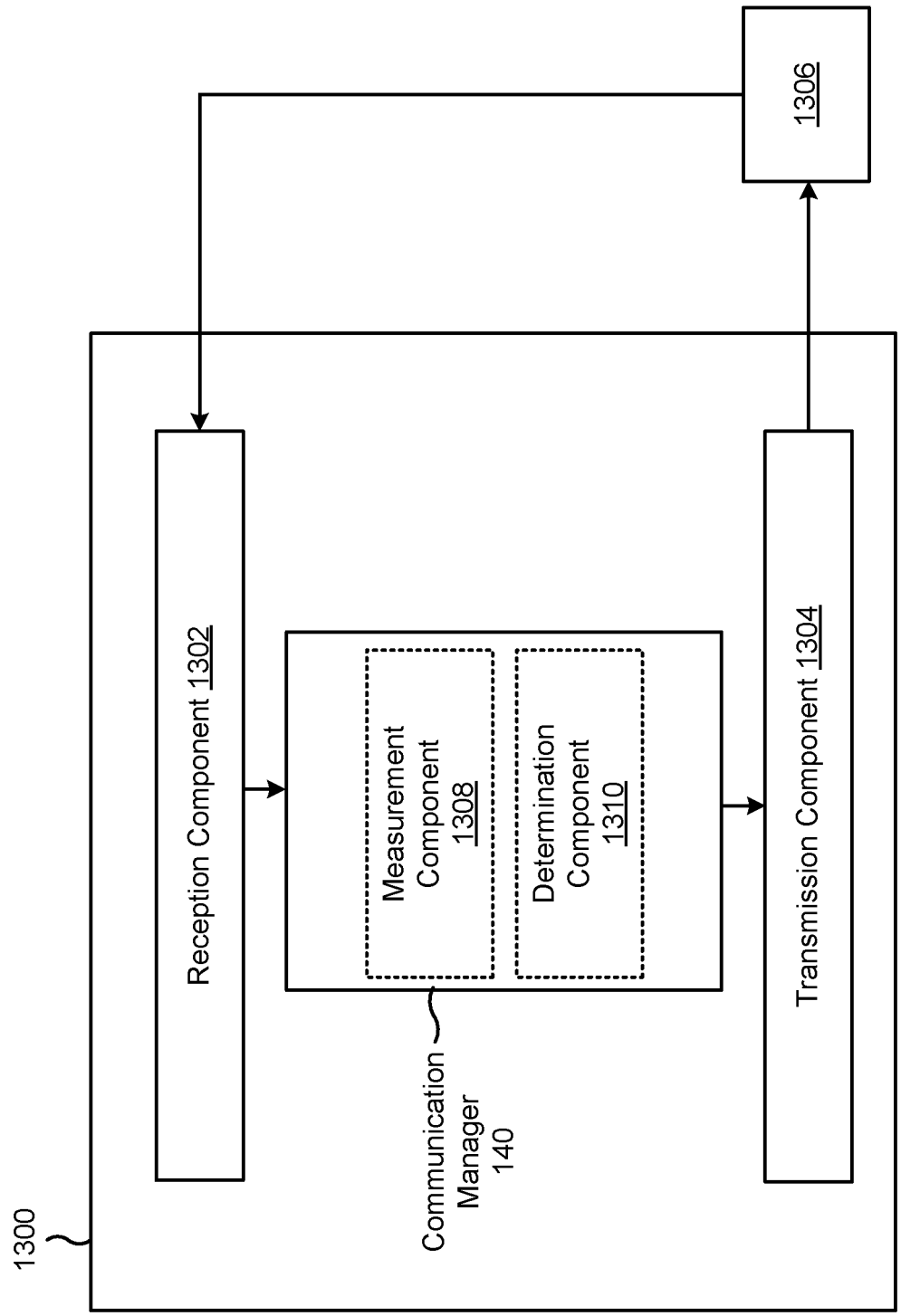
FIGS. 13-14 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a measurement component 1308 and/or a determination component 1310, among other examples.

In some aspects, the apparatus 1300 may be configured to perform one or more operations described herein in connection with FIGS. 8-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive a cell-level CLI-SRS configuration, wherein the cell-level CLI-SRS configuration identifies CLI-SRS resources in one or more full-duplex slots for cross link interference measurements associated with Uu and sidelink communications. The reception component 1302 may receive an indication to transmit a CLI-SRS, or to measure cross link interference, in a CLI-SRS resource of the CLI-SRS resources identified in the cell-level CLI-SRS configuration. The transmission component 1304 may transmit the CLI-SRS in the CLI-SRS resource, or the measurement component 1308 may measure cross-link interference in connection with a CLI-SRS transmission from a second UE in the CLI-SRS resource, based at least in part on the indication.

The transmission component 1304 may transmit, to a base station, an indication of the cross link interference measured in the CLI-SRS resource.

The reception component 1302 may receive, from a base station, a configuration of periodic or semi-persistent uplink resources for reporting cross link interference measurements.

The transmission component 1304 may transmit, to the base station, an indication of the cross link interference measured in the CLI-SRS resource using the periodic or semi-persistent uplink resources.

The reception component 1302 may receive, from a base station, an indication for triggering an aperiodic cross link interference report.

The transmission component 1304 may transmit, to the base station, the aperiodic cross link interference report including an indication of the cross link interference measured in the CLI-SRS resource based at least in part on receiving the indication for triggering the aperiodic cross link interference report.

The transmission component 1304 may transmit, to a transmitting UE associated with the sidelink reception at the first UE, an indication of the cross link interference measured in the CLI-SRS resource.

The transmission component 1304 may transmit an indication of the cross link interference measured in the CLI-SRS resource using a configured periodic or semi-persistent sidelink resource cross link interference reporting resource in the sidelink resource pool.

The determination component 1310 may determine a sidelink identifier for the second UE based at least in part on a mapping between the CLI-SRS resource and the sidelink identifier.

The transmission component 1304 may transmit an indication of the cross link interference measured in the CLI-SRS resource to the second UE based at least in part on the sidelink identifier for the second UE.

The transmission component 1304 may transmit an indication of the cross link interference measured in the CLI- SRS resource on a cross link interference reporting resource associated with the CLI-SRS resource.

The reception component 1302 may receive, via an inter-UE coordination message from the second UE, an indication that the CLI-SRS resource is associated with the second UE, wherein measuring the cross link interference from the sidelink transmission by the second UE on the sidelink reception at the first UE is based at least in part on receiving the indication that the CLI-SRS resource is associated with the second UE.

The transmission component 1304 may transmit, via an inter-UE coordination message to the second UE, an indication of the cross link interference measured in the CLI-SRS resource.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
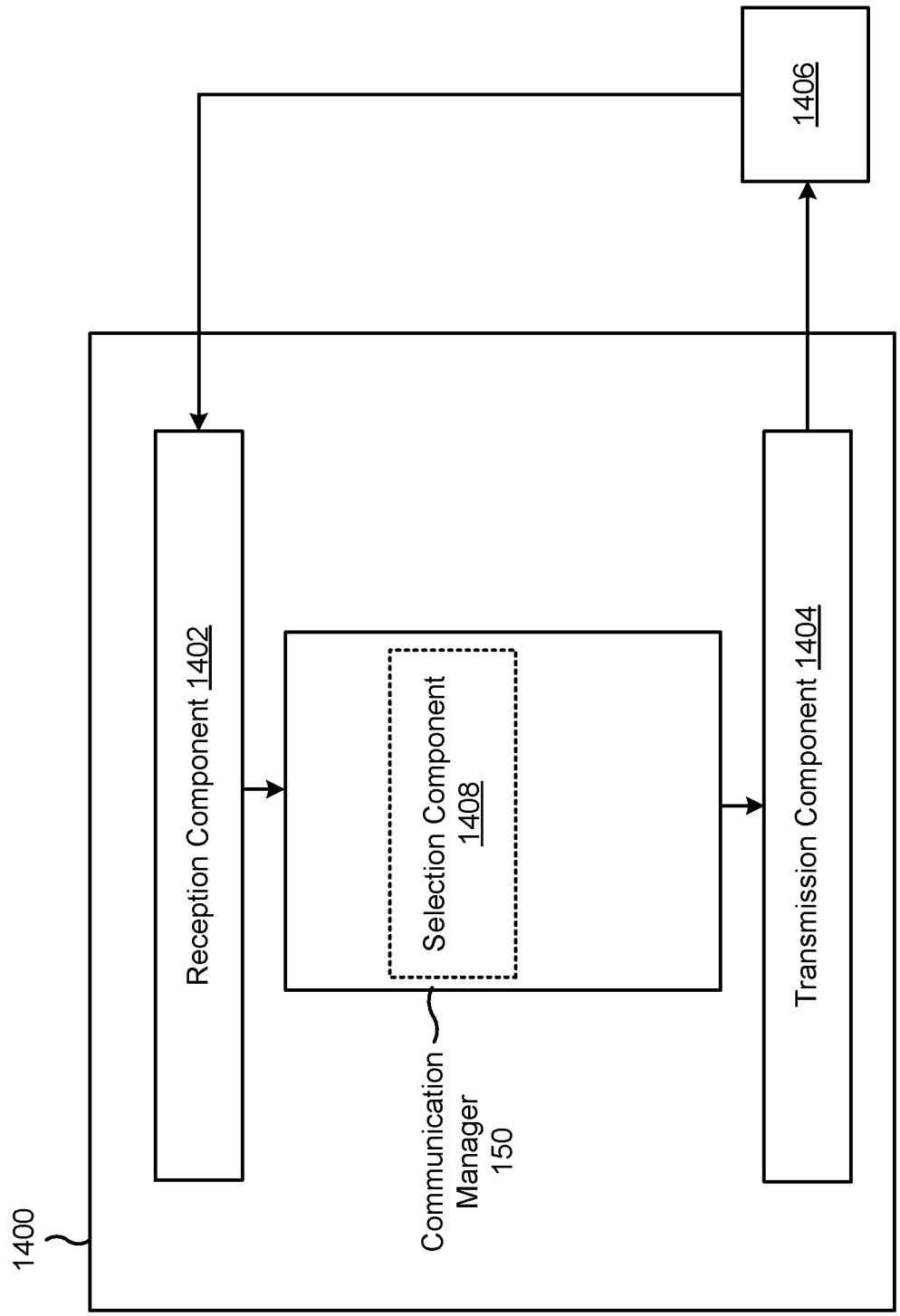

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a selection component 1408.

In some aspects, the apparatus 1400 may be configured to perform one or more operations described herein in connection with FIGS. 8-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The transmission component 1404 may transmit, to a UE, a cell-level CLI-SRS configuration, wherein the cell-level CLI-SRS configuration identifies CLI-SRS resources in one or more full-duplex slots for cross link interference measurements associated with Uu and sidelink communications. The transmission component 1404 may transmit, to the UE, an indication to transmit a CLI-SRS, or to measure cross link interference, in a CLI-SRS resource of the CLI-SRS resources identified in the cell-level CLI-SRS configuration.

The selection component 1408 may select whether to transmit, to the UE, an indication to transmit the CLI-SRS in the CLI-SRS resource or an indication to measure the cross link interference in the CLI-SRS resource.

The reception component 1402 may receive, from the UE, an indication of the cross link interference measured in the CLI-SRS resource.

The transmission component 1404 may transmit, to the UE, a configuration of periodic or semi-persistent uplink resources for reporting cross link interference measurements.

The reception component 1402 may receive, from the UE, an indication of the cross link interference measured in the CLI-SRS resource using the periodic or semi-persistent uplink resources.

The transmission component 1404 may transmit, to the UE, an indication for triggering an aperiodic cross link interference report.

The reception component 1402 may receive, from the UE, the aperiodic cross link interference report including an indication of the cross link interference measured in the CLI-SRS resource.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first user equipment (UE), comprising: receiving a cell-level cross link interference sounding reference signal (CLI-SRS) configuration, wherein the cell-level CLI-SRS configuration identifies CLI-SRS resources in one or more full-duplex slots for cross link interference measurements associated with Uu and sidelink communications; receiving an indication to transmit a CLI-SRS, or to measure cross link interference, in a CLI-SRS resource of the CLI-SRS resources identified in the cell-level CLI-SRS configuration; and transmitting the CLI-SRS in the CLI-SRS resource or measuring cross-link interference in connection with a CLI-SRS transmission from a second UE in the CLI-SRS resource based at least in part on the indication.

Aspect 2: The method of Aspect 1, wherein receiving the cell-level CLI-SRS configuration comprises: receiving a serving cell configuration that includes the cell-level CLI-SRS configuration.

Aspect 3: The method of Aspect 1, wherein receiving the cell-level CLI-SRS configuration comprises: receiving a sidelink resource pool configuration that includes the cell-level CLI-SRS configuration.

Aspect 4: The method of any of Aspects 1-3, wherein the CLI-SRS resources identified by the cell-level CLI-SRS configuration include periodic CLI-SRS resources.

Aspect 5: The method of any of Aspects 1-4, wherein the cell-level CLI-SRS configuration includes a configuration of periodic CLI-SRS resources in a sidelink resource pool.

Aspect 6: The method of any of Aspects 1-5, wherein receiving the indication comprises receiving the indication to measure cross link interference in the CLI-SRS resource, and wherein transmitting the CLI-SRS in the CLI-SRS resource or measuring cross-link interference comprises: measuring cross link interference in connection with the CLI-SRS transmission from the second UE in the CLI-SRS resource.

Aspect 7: The method of Aspect 6, wherein receiving the indication to measure cross link interference in the CLI-SRS resource comprises: receiving, from a base station, a configuration of a zero power CLI-SRS (ZP-CLI-SRS) for the CLI-SRS resource.

Aspect 8: The method of any of Aspects 6-7, wherein measuring cross link interference in connection with the CLI-SRS transmission from the second UE in the CLI-SRS resource comprises: measuring cross link interference from a sidelink or uplink transmission by the second UE on downlink reception by the first UE based at least in part on the CLI-SRS transmission from the second UE in the CLI-SRS resource.

Aspect 9: The method of Aspect 8, further comprising: transmitting, to a base station, an indication of the cross link interference measured in the CLI-SRS resource.

Aspect 10: The method of any of Aspects 6-7, wherein the CLI-SRS resource is a periodic CLI-SRS configured for a sidelink resource pool, and wherein receiving the indication to measure cross link interference in the CLI-SRS resource comprises: receiving a configuration of sidelink cross link interference measurement resources that indicates that an occurrence of the CLI-SRS in the sidelink resource pool is configured as a cross link interference measurement resource for the UE.

Aspect 11: The method of Aspect 10, wherein measuring cross link interference in connection with the CLI-SRS transmission from the second UE in the CLI-SRS resource comprises: measuring cross link interference from an uplink transmission by the second UE on sidelink reception at the first UE based at least in part on the CLI-SRS transmission from the second UE.

Aspect 12: The method of Aspect 11, further comprising: receiving, from a base station, a configuration of periodic or semi-persistent uplink resources for reporting cross link interference measurements; and transmitting, to the base station, an indication of the cross link interference measured in the CLI-SRS resource using the periodic or semi-persistent uplink resources.

Aspect 13: The method of Aspect 11, further comprising: receiving, from a base station, an indication for triggering an aperiodic cross link interference report; and transmitting, to the base station, the aperiodic cross link interference report including an indication of the cross link interference measured in the CLI-SRS resource based at least in part on receiving the indication for triggering the aperiodic cross link interference report.

Aspect 14: The method of Aspect 11, further comprising: transmitting, to a transmitting UE associated with the sidelink reception at the first UE, an indication of the cross link interference measured in the CLI-SRS resource.

Aspect 15: The method of Aspect 11, further comprising: transmitting an indication of the cross link interference measured in the CLI-SRS resource using a configured periodic or semi-persistent sidelink resource cross link interference reporting resource in the sidelink resource pool.

Aspect 16: The method of Aspect 10, wherein measuring cross link interference in connection with the CLI-SRS transmission from the second UE in the CLI-SRS resource comprises: measuring cross link interference from sidelink transmission by the second UE on sidelink reception at the first UE based at least in part on the CLI-SRS transmission from the second UE in the CLI-SRS resource.

Aspect 17: The method of Aspect 16, further comprising: determining a sidelink identifier for the second UE based at least in part on a mapping between the CLI-SRS resource and the sidelink identifier; and transmitting an indication of the cross link interference measured in the CLI-SRS resource to the second UE based at least in part on the sidelink identifier for the second UE.

Aspect 18: The method of Aspect 16, further comprising: transmitting an indication of the cross link interference measured in the CLI-SRS resource on a cross link interference reporting resource associated with the CLI-SRS resource.

Aspect 19: The method of Aspect 16, further comprising: receiving, via an inter-UE coordination message from the second UE, an indication that the CLI-SRS resource is associated with the second UE, wherein measuring the cross link interference from the sidelink transmission by the second UE on the sidelink reception at the first UE is based at least in part on receiving the indication that the CLI-SRS resource is associated with the second UE; and transmitting, via an inter-UE coordination message to the second UE, an indication of the cross link interference measured in the CLI-SRS resource.

Aspect 20: The method of any of Aspects 1-5, wherein receiving the indication comprises receiving the indication to transmit the CLI-SRS in the CLI-SRS resource, and wherein transmitting the CLI-SRS in the CLI-SRS resource or measuring cross-link interference comprises: transmitting the CLI-SRS in the CLI-SRS resource.

Aspect 21: The method of Aspect 20, wherein receiving the indication to transmit the CLI-SRS in the CLI-SRS resource comprises: receiving, from a base station, a configuration of a non-zero power CLI-SRS (NZP-CLI-SRS) for the CLI-SRS resource.

Aspect 22: A method of wireless communication performed by a base station, comprising: transmitting, to a user equipment (UE), a cell-level cross link interference sounding reference signal (CLI-SRS) configuration, wherein the cell-level CLI-SRS configuration identifies CLI-SRS resources in one or more full-duplex slots for cross link interference measurements associated with Uu and sidelink communications; and transmitting, to the UE, an indication to transmit a CLI-SRS, or to measure cross link interference, in a CLI-SRS resource of the CLI-SRS resources identified in the cell-level CLI-SRS configuration.

Aspect 23: The method of Aspect 22, wherein transmitting the cell-level CLI-SRS configuration comprises: transmitting, to the UE, a serving cell configuration that includes the cell-level CLI-SRS configuration.

Aspect 24: The method of Aspect 22, wherein transmitting the cell-level CLI-SRS configuration comprises: transmitting, to the UE, a sidelink resource pool configuration that includes the cell-level CLI-SRS configuration.

Aspect 25: The method of any of Aspects 22-24, wherein the CLI-SRS resources identified by the cell-level CLI-SRS configuration include periodic CLI-SRS resources.

Aspect 26: The method of any of Aspects 22-25, wherein the cell-level CLI-SRS configuration includes a configuration of periodic CLI-SRS resources in a sidelink resource pool.

Aspect 27: The method of any of Aspects 22-26, wherein transmitting the indication comprises transmitting, to the UE, the indication to measure cross link interference in the CLI-SRS resource.

Aspect 28: The method of Aspect 27, wherein transmitting the indication to measure cross link interference in the CLI-SRS resource comprises: transmitting, to the UE, a configuration of a zero power CLI-SRS (ZP-CLI-SRS) for the CLI-SRS resource.

Aspect 29: The method of any of Aspects 27-28, further comprising: receiving, from the UE, an indication of the cross link interference measured in the CLI-SRS resource.

Aspect 30: The method of any of Aspects 27-29, wherein the CLI-SRS resource is a periodic CLI-SRS configured for a sidelink resource pool, and wherein transmitting the indication to measure the cross link interference in the CLI-SRS resource comprises: transmitting, to the UE, a configuration of sidelink cross link interference measurement resources that indicates that an occurrence of the CLI-SRS in the sidelink resource pool is configured as a cross link interference measurement resource for the UE.

Aspect 31: The method of Aspect 30, further comprising: transmitting, to the UE, a configuration of periodic or semi-persistent uplink resources for reporting cross link interference measurements; and receiving, from the UE, an indication of the cross link interference measured in the CLI-SRS resource using the periodic or semi-persistent uplink resources.

Aspect 32: The method of Aspect 30, further comprising: transmitting, to the UE, an indication for triggering an aperiodic cross link interference report; and receiving, from the UE, the aperiodic cross link interference report including an indication of the cross link interference measured in the CLI-SRS resource.

Aspect 33: The method of any of Aspects 22-26, wherein transmitting the indication comprises: transmitting, to the UE, the indication to transmit the CLI-SRS in the CLI-SRS resource.

Aspect 34: The method of Aspect 33, wherein transmitting the indication to transmit the CLI-SRS in the CLI-SRS resource comprises: transmitting, to the UE, a configuration of a non-zero power CLI-SRS (NZP-CLI-SRS) for the CLI-SRS resource.

Aspect 35: An apparatus for wireless communication at a device, comprising a processor; memory coupled with the processor; and instructions stored in the memory and executable by the processor to cause the apparatus to perform the method of one or more of Aspects 1-21.

Aspect 36: A device for wireless communication, comprising a memory and one or more processors coupled to the memory, the one or more processors configured to perform the method of one or more of Aspects 1-21.

Aspect 37: An apparatus for wireless communication, comprising at least one means for performing the method of one or more of Aspects 1-21.

Aspect 38: A non-transitory computer-readable medium storing code for wireless communication, the code comprising instructions executable by a processor to perform the method of one or more of Aspects 1-21.

Aspect 39: A non-transitory computer-readable medium storing a set of instructions for wireless communication, the set of instructions comprising one or more instructions that, when executed by one or more processors of a device, cause the device to perform the method of one or more of Aspects 1-21.

Aspect 40: An apparatus for wireless communication at a device, comprising a processor; memory coupled with the processor; and instructions stored in the memory and executable by the processor to cause the apparatus to perform the method of one or more of Aspects 22-34.

Aspect 41: A device for wireless communication, comprising a memory and one or more processors coupled to the memory, the one or more processors configured to perform the method of one or more of Aspects 22-34.

Aspect 42: An apparatus for wireless communication, comprising at least one means for performing the method of one or more of Aspects 22-34.

Aspect 43: A non-transitory computer-readable medium storing code for wireless communication, the code comprising instructions executable by a processor to perform the method of one or more of Aspects 22-34.

Aspect 44: A non-transitory computer-readable medium storing a set of instructions for wireless communication, the set of instructions comprising one or more instructions that, when executed by one or more processors of a device, cause the device to perform the method of one or more of Aspects 22-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving a cell-level cross link interference sounding reference signal (CLI-SRS) configuration, wherein the cell-level CLI-SRS configuration identifies CLI-SRS resources in one or more full-duplex slots for cross link interference measurements, the cross link interference measurements being associated with Uu communications that at least partially overlap in time with sidelink communications in the one or more full-duplex slots;
   receiving an indication to transmit a CLI-SRS, or to measure cross link interference, in a CLI-SRS resource of the CLI-SRS resources identified in the cell-level CLI-SRS configuration; and
   transmitting the CLI-SRS in the CLI-SRS resource or measuring cross link interference in connection with a CLI-SRS transmission from a second UE in the CLI-SRS resource based at least in part on the indication.

2. The method of claim 1, wherein receiving the cell-level CLI-SRS configuration comprises:
   receiving a serving cell configuration that includes the cell-level CLI-SRS configuration.

3. The method of claim 1, wherein receiving the cell-level CLI-SRS configuration comprises:
   receiving a sidelink resource pool configuration that includes the cell-level CLI-SRS configuration.

4. The method of claim 1, wherein the CLI-SRS resources identified by the cell-level CLI-SRS configuration include periodic CLI-SRS resources.

5. The method of claim 1, wherein the cell-level CLI-SRS configuration includes a configuration of periodic CLI-SRS resources in a sidelink resource pool.

6. The method of claim 1, wherein receiving the indication comprises receiving the indication to measure cross link interference in the CLI-SRS resource, and wherein transmitting the CLI-SRS in the CLI-SRS resource or measuring cross link interference comprises:
   measuring cross link interference in connection with the CLI-SRS transmission from the second UE in the CLI-SRS resource.

7. The method of claim 6, wherein receiving the indication to measure cross link interference in the CLI-SRS resource comprises:
   receiving, from a network entity, a configuration of a zero power CLI-SRS (ZP-CLI-SRS) for the CLI-SRS resource.

8. The method of claim 6, wherein measuring cross link interference in connection with the CLI-SRS transmission from the second UE in the CLI-SRS resource comprises:
   measuring cross link interference from a sidelink or uplink transmission by the second UE on downlink reception by the first UE based at least in part on the CLI-SRS transmission from the second UE in the CLI-SRS resource.

9. The method of claim 8, further comprising:
   transmitting, to a network entity, an indication of the cross link interference measured in the CLI-SRS resource.

10. The method of claim 6, wherein the CLI-SRS resource is a periodic CLI-SRS configured for a sidelink resource pool, and wherein receiving the indication to measure cross link interference in the CLI-SRS resource comprises:
    receiving a configuration of sidelink cross link interference measurement resources that indicates that an occurrence of the CLI-SRS in the sidelink resource pool is configured as a cross link interference measurement resource for the UE.

11. The method of claim 10, wherein measuring cross link interference in connection with the CLI-SRS transmission from the second UE in the CLI-SRS resource comprises:
    measuring cross link interference from an uplink transmission by the second UE on sidelink reception at the first UE based at least in part on the CLI-SRS transmission from the second UE.

12. The method of claim 11, further comprising:
receiving, from a network entity, a configuration of periodic or semi-persistent uplink resources for reporting cross link interference measurements; and
transmitting, to the network entity, an indication of the cross link interference measured in the CLI-SRS resource using the periodic or semi-persistent uplink resources.

13. The method of claim 11, further comprising:
receiving, from a network entity, an indication for triggering an aperiodic cross link interference report; and
transmitting, to the network entity, the aperiodic cross link interference report including an indication of the cross link interference measured in the CLI-SRS resource based at least in part on receiving the indication for triggering the aperiodic cross link interference report.

14. The method of claim 11, further comprising:
transmitting, to a transmitting UE associated with the sidelink reception at the first UE, an indication of the cross link interference measured in the CLI-SRS resource.

15. The method of claim 11, further comprising:
transmitting an indication of the cross link interference measured in the CLI-SRS resource using a configured periodic or semi-persistent sidelink resource cross link interference reporting resource in the sidelink resource pool.

16. The method of claim 10, wherein measuring cross link interference in connection with the CLI-SRS transmission from the second UE in the CLI-SRS resource comprises:
measuring cross link interference from sidelink transmission by the second UE on sidelink reception at the first UE based at least in part on the CLI-SRS transmission from the second UE in the CLI-SRS resource.

17. The method of claim 16, further comprising:
determining a sidelink identifier for the second UE based at least in part on a mapping between the CLI-SRS resource and the sidelink identifier; and
transmitting an indication of the cross link interference measured in the CLI-SRS resource to the second UE based at least in part on the sidelink identifier for the second UE.

18. The method of claim 16, further comprising:
transmitting an indication of the cross link interference measured in the CLI-SRS resource on a cross link interference reporting resource associated with the CLI-SRS resource.

19. The method of claim 16, further comprising:
receiving, via an inter-UE coordination message from the second UE, an indication that the CLI-SRS resource is associated with the second UE, wherein measuring the cross link interference from the sidelink transmission by the second UE on the sidelink reception at the first UE is based at least in part on receiving the indication that the CLI-SRS resource is associated with the second UE; and
transmitting, via an inter-UE coordination message to the second UE, an indication of the cross link interference measured in the CLI-SRS resource.

20. The method of claim 1, wherein receiving the indication comprises receiving the indication to transmit the CLI-SRS in the CLI-SRS resource, and wherein transmitting the CLI-SRS in the CLI-SRS resource or measuring cross link interference comprises:
transmitting the CLI-SRS in the CLI-SRS resource.

21. The method of claim 20, wherein receiving the indication to transmit the CLI-SRS in the CLI-SRS resource comprises:
receiving, from a network entity, a configuration of a non-zero power CLI-SRS (NZP-CLI-SRS) for the CLI-SRS resource.

22. A method of wireless communication performed by a network entity, comprising:
transmitting, to a user equipment (UE), a cell-level cross link interference sounding reference signal (CLI-SRS) configuration, wherein the cell-level CLI-SRS configuration identifies CLI-SRS resources in one or more full-duplex slots for cross link interference measurements, the cross link interference measurements being associated with Uu communications that at least partially overlap in time with sidelink communications in the one or more full-duplex slots; and
transmitting, to the UE, an indication to transmit a CLI-SRS, or to measure cross link interference, in a CLI-SRS resource of the CLI-SRS resources identified in the cell-level CLI-SRS configuration.

23. The method of claim 22, wherein transmitting the indication comprises transmitting, to the UE, the indication to measure cross link interference in the CLI-SRS resource.

24. The method of claim 23, further comprising:
receiving, from the UE, an indication of the cross link interference measured in the CLI-SRS resource.

25. The method of claim 23, wherein the CLI-SRS resource is a periodic CLI-SRS configured for a sidelink resource pool, and wherein transmitting the indication to measure the cross link interference in the CLI-SRS resource comprises:
transmitting, to the UE, a configuration of sidelink cross link interference measurement resources that indicates that an occurrence of the CLI-SRS in the sidelink resource pool is configured as a cross link interference measurement resource for the UE.

26. The method of claim 22, wherein transmitting the indication comprises:
transmitting, to the UE, the indication to transmit the CLI-SRS in the CLI-SRS resource.

27. A first user equipment (UE) for wireless communication, comprising:
one or more memories; and
one or more processors, coupled to the one or more memories, configured to:
receive a cell-level cross link interference sounding reference signal (CLI-SRS) configuration, wherein the cell-level CLI-SRS configuration identifies CLI-SRS resources in one or more full-duplex slots for cross link interference measurements, the cross link interference measurements being associated with Uu communications that at least partially overlap in time with sidelink communications in the one or more full-duplex slots;
receive an indication to transmit a CLI-SRS, or to measure cross link interference, in a CLI-SRS resource of the CLI-SRS resources identified in the cell-level CLI-SRS configuration; and
transmit the CLI-SRS in the CLI-SRS resource or measure cross link interference in connection with a CLI-SRS transmission from a second UE in the CLI-SRS resource based at least in part on the indication.

28. The first UE of claim 27, wherein the one or more processors, to receive the indication, are configured to receive the indication to measure cross link interference in the CLI-SRS resource, and wherein the one or more processors, to transmit the CLI-SRS in the CLI-SRS resource or measure cross link interference, are configured to:

measure cross link interference in connection with the CLI-SRS transmission from the second UE in the CLI-SRS resource.

29. The first UE of claim 27, wherein the one or more processors, to receive the indication, are configured to receive the indication to transmit the CLI-SRS in the CLI-SRS resource, and wherein the one or more processors, to transmit the CLI-SRS in the CLI-SRS resource or measure cross link interference, are configured to:

transmit the CLI-SRS in the CLI-SRS resource.

30. A network entity for wireless communication, comprising:

one or more memories; and
one or more processors, coupled to the one or more memories, configured to:
transmit, to a user equipment (UE), a cell-level cross link interference sounding reference signal (CLI-SRS) configuration, wherein the cell-level CLI-SRS configuration identifies CLI-SRS resources in one or more full-duplex slots for cross link interference measurements, the cross link interference measurements being associated with Uu communications that at least partially overlap in time with sidelink communications in the one or more full-duplex slots; and
transmit, to the UE, an indication to transmit a CLI-SRS, or to measure cross link interference, in a CLI-SRS resource of the CLI-SRS resources identified in the cell-level CLI-SRS configuration.

* * * * *